(12) United States Patent
Hashino et al.

(10) Patent No.: US 11,349,395 B2
(45) Date of Patent: May 31, 2022

(54) CONVERSION APPARATUS, DEVICE, AND CONTROL METHOD

(71) Applicant: HONDA MOTOR CO., LTD., Tokyo (JP)

(72) Inventors: Satoshi Hashino, Saitama (JP); Masaaki Komatsu, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 479 days.

(21) Appl. No.: 16/338,755

(22) PCT Filed: Oct. 3, 2016

(86) PCT No.: PCT/JP2016/079350
§ 371 (c)(1),
(2) Date: Apr. 2, 2019

(87) PCT Pub. No.: WO2018/066042
PCT Pub. Date: Apr. 12, 2018

(65) Prior Publication Data
US 2021/0281186 A1  Sep. 9, 2021

(51) Int. Cl.
*H02M 3/158* (2006.01)
*H02M 7/537* (2006.01)
(Continued)

(52) U.S. Cl.
CPC ....... *H02M 3/1584* (2013.01); *H02M 1/0009* (2021.05); *H02M 1/0025* (2021.05);
(Continued)

(58) Field of Classification Search
CPC ............ H02M 7/42; H02M 7/44; H02M 7/53; H02M 7/537; H02M 7/5395
See application file for complete search history.

(56) References Cited

U.S. PATENT DOCUMENTS

| 4,748,397 A | 5/1988 | Ogawa et al. |
| 6,795,009 B2 | 9/2004 | Duffy et al. |

(Continued)

FOREIGN PATENT DOCUMENTS

| CN | 104009618 A | 8/2014 |
| CN | 105099152 A | 11/2015 |

(Continued)

OTHER PUBLICATIONS

May 19, 2020, Chinese Office Action issued for related CN application No. 201680089806.X.

(Continued)

*Primary Examiner* — Gary L Laxton
(74) *Attorney, Agent, or Firm* — Paratus Law Group, PLLC

(57) ABSTRACT

A conversion apparatus includes: a conversion module having plural phases, each including a converter and a sensor, in which the plural phases are electrically connected in parallel, and a controller. The controller includes a first unit for determining a basic duty ratio common to all of the plural phases, so that an input or an output of the conversion module becomes equal to a target voltage or a target current, a second unit for determining a correction duty ratio and correcting the basic duty ratio for each of the plural converters, and a generator for generating the control signal based on the basic duty ratio and the correction duty ratio. The second unit determines the correction duty ratio based on a difference between plural phase currents respectively flowing in the plural converters. The basic duty ratio is equal to or greater than an absolute value of the correction duty ratio.

12 Claims, 19 Drawing Sheets

(51) Int. Cl.
  *H02M 1/00*   (2006.01)
  *H02M 7/5387*   (2007.01)
  *H02P 27/06*   (2006.01)

(52) U.S. Cl.
  CPC ......... *H02M 3/1586* (2021.05); *H02M 7/537* (2013.01); *H02M 1/007* (2021.05); *H02M 7/5387* (2013.01); *H02P 27/06* (2013.01)

(56) References Cited

U.S. PATENT DOCUMENTS

| | | | |
|---|---|---|---|
| 8,598,853 | B2 | 12/2013 | Tang et al. |
| 10,305,392 | B2 * | 5/2019 | Komatsu ................ B60L 50/51 |
| 2009/0257257 | A1 | 10/2009 | Adragna et al. |
| 2011/0031941 | A1 | 2/2011 | Green |
| 2012/0049813 | A1 | 3/2012 | Huang et al. |
| 2014/0055114 | A1 | 2/2014 | Tang et al. |
| 2015/0333629 | A1 | 11/2015 | Jang et al. |
| 2016/0359410 | A1 * | 12/2016 | Kumasaka ............ H02M 3/157 |

FOREIGN PATENT DOCUMENTS

| | | |
|---|---|---|
| JP | S62-058871 A | 3/1987 |
| JP | H07-221619 A | 8/1995 |
| JP | 2012-065453 A | 3/2012 |
| WO | WO 2013/038512 A1 | 3/2013 |

OTHER PUBLICATIONS

Dec. 13, 2016, International Search Report issued for related PCT application No. PCT/JP2016/079350.

Dec. 13, 2016, International Search Opinion issued for related PCT application No. PCT/JP2016/079350.

Apr. 21, 2020, Japanese Office Action issued for related JP Application No. 2018-543498.

* cited by examiner (A) DISCHARGING PERIOD OF REACTOR L2

(B) CHARGING PERIOD OF REACTOR L2

(A) DISCHARGING PERIOD OF REACTOR L1

(B) CHARGING PERIOD OF REACTOR L1

CONVERSION APPARATUS, DEVICE, AND CONTROL METHOD

CROSS REFERENCE TO PRIOR APPLICATION

This application is a National Stage Patent Application of PCT International Patent Application No. PCT/JP2016/079350 (filed on Oct. 3, 2016) under 35 U.S.C. § 371, which is hereby incorporated by reference in its entirety.

TECHNICAL FIELD

The present invention relates to a conversion apparatus, device, and a control method.

BACKGROUND ART

Patent Literature 1 discloses a method and apparatus for balancing load distribution of semiconductor modules for electric power, in which the semiconductor modules are connected in parallel to a converter performing a voltage conversion, and a turn-on time period and a turn-off time period of a switch in each module are set so that every module acquires uniform current load during the switching. Specifically, an actual current value of each module is measured as an actual load value, an average of the measured actual currents is set as a desired current value with respect to each module, and a level of a gate signal to each switch is increased or decreased based on a difference between the desired current value and the actual current value. A technique disclosed in Patent Literature 1 is also disclosed in Patent Literature 2, Patent Literature 3, and Patent Literature 4.

CITATION LIST

Patent Literature

[Patent Literature 1] JP-A-07-221619
[Patent Literature 2] U.S. Pat. No. 6,795,009
[Patent Literature 3] U.S. Pat. No. 8,598,853
[Patent Literature 4] US Patent Application Publication No. 2014/0055114

SUMMARY OF INVENTION

Technical Problem

In the technique disclosed in Patent Literature 1, since a level of a gate signal is increased or decreased based on a difference between an actual current value of each module and an average of the actual currents, when the value of the difference value is large and the level of the gate signal is 0, a converter consisting of semiconductor modules for electric power connected in parallel does not efficiently perform a voltage conversion that is an original function thereof.

An object of the present invention is to provide a conversion apparatus, a device, and a control method, which can reduce a drift current of a phase current among a plurality of phases without affecting a voltage conversion efficiency that is an original function thereof.

Solution to Problem

The present invention provides the following embodiments.

A first aspect defines a conversion apparatus including:
a conversion module (e.g., an VCU 111 in an embodiment below) having a plurality of phases, each of which includes a converter capable of performing a voltage conversion of electric power discharged from or charged in a power source (e.g., a battery 105 in the embodiment below) and a sensor (e.g., phase current sensors 1151 and 1152 in the embodiment below) for detecting a current value of a phase current flowing in the converter, in which the plurality of phases are electrically connected in parallel; and
a controller (e.g., an ECU 113 or 213 in the embodiment below) for controlling a plurality of converters respectively according to a control signal generated based on a predetermined duty ratio, in which
the controller includes:
a first determination unit (e.g., a basic controller 121 or 221 in the embodiment below) for determining a basic duty ratio common to all of the plurality of phases, so that an input or an output of the conversion module becomes equal to a target voltage or a target current;
a second determination unit (e.g., an equalization controller 125 or 225, or an upper limit restriction unit 227 in the embodiment below) for determining a correction duty ratio including at least one positive value and at least one negative value and correcting the basic duty ratio for each of the plurality of converters; and
a generator (e.g., a control signal generator 127 or 229 in the embodiment below) for generating the control signal based on the basic duty ratio and the correction duty ratio, wherein
the second determination unit determines the correction duty ratio based on a difference between a plurality of phase currents respectively flowing in the plurality of converters, and
the basic duty ratio is equal to or greater than the absolute value of the correction duty ratio.

A second aspect defines, based on the first aspect, the conversion apparatus, wherein
the absolute value of a sum of individual correction duty ratios with respect to the plurality of converters is equal to or less than a predetermined value.

A third aspect defines, based on the second aspect, the conversion apparatus, wherein
the sum of individual correction duty ratios with respect to the plurality of converters is 0.

A fourth aspect defines, based on the first to third aspects, the conversion apparatus, wherein,
the second determination unit determines the correction duty ratio that is within an upper limit or a lower limit whose absolute value is smaller than the basic duty ratio.

A fifth aspect defines, based on the fourth aspect, the conversion apparatus, wherein
the absolute value of the upper limit or the lower limit is a value equal to or greater than a maximum value of the correction duty ratio that is determined from a difference between current values that are output normally from all of sensors included in the plurality of phases.

A sixth aspect defines, based on the fourth aspect, the conversion apparatus, wherein
the absolute value of the upper limit or the lower limit is a value equal to or less than a minimum value of the correction duty ratio that is determined from a difference between current values that are output when some of sensors included in the plurality of phases are abnormal.

A seventh aspect defines, based on the fourth aspect, the conversion apparatus, wherein
the absolute value of the upper limit or the lower limit is a value equal to or greater than a maximum value of the correction duty ratio that is determined from a difference between current values that are output normally from all of sensors included in the plurality of phases, and a value equal to or less than a minimum value of the correction duty ratio that is determined from a difference between current values that are output when some of the sensors included in the plurality of phases are abnormal.

An eighth aspect defines, based on the seventh aspect, the conversion apparatus, wherein
the absolute value of the upper limit or the lower limit is closer to the maximum value than the minimum value.

A ninth aspect defines a conversion apparatus including:
a conversion module (e.g., an VCU 111 in an embodiment below) having two phases, each of which includes a converter capable of performing a voltage conversion of electric power discharged from or charged in a power source (e.g., a battery 105 in the embodiment below) and a sensor (e.g., phase current sensors 1151 and 1152 in the embodiment below) for detecting a current value of a phase current flowing in the converter, in which the two phases are electrically connected in parallel; and
a controller (e.g., an ECU 113 or 213 in the embodiment below) for controlling two converters respectively according to a control signal generated based on a predetermined duty ratio, in which
the controller includes:
a first determination unit (e.g., a basic controller 121 or 221 in the embodiment below) for determining a basic duty ratio common to all of the plurality of phases, so that an output of the conversion module becomes equal to a target voltage or a target current;
a second determination unit (e.g., an equalization controller 125 or 225 and an upper limit restriction unit 227 in the embodiment below) for determining a correction duty ratio including at least one positive value and at least one negative value and correcting the basic duty ratio for each of the two converters; and
a generator (e.g., a control signal generator 127 or 229 in the embodiment below) for generating the control signal based on the basic duty ratio and the correction duty ratio, wherein
the second determination unit determines the correction duty ratio based on a difference between a plurality of phase currents respectively flowing in the two converters, and
the basic duty ratio is equal to or greater than the absolute value of the correction duty ratio.

A tenth aspect defines a device including the conversion apparatus according to one of the first to ninth aspects.

An eleventh aspect defines a control method of a conversion apparatus including a conversion module (e.g., an VCU 111 in an embodiment below) having a plurality of phases, each of which includes a converter capable of performing a voltage conversion of electric power discharged from or charged in a power source (e.g., a battery 105 in the embodiment below) and a sensor (e.g., a phase current sensor 1151 or 1152 in the embodiment below) for detecting a current value of a phase current flowing in the converter, in which the plurality of phases are electrically connected in parallel, and
a controller (for example, an ECU 113 or 213 in the embodiments below) for controlling a plurality of converters respectively according to a control signal generated based on a predetermined duty ratio,
the method including:
determining a basic duty ratio that is common to all of the plurality of phases so that an output of the conversion module becomes equal to a target voltage or a target current;
determining individual correction duty ratios with respect to the plurality of converters based on a difference among a plurality of phase currents flowing in the plurality of converters respectively, in which the correction duty ratio includes at least one positive value and at least one negative value and the absolute value of the correction duty ratio is equal to or less than the basic duty ratio; and
generating the control signal based on the basic duty ratio and the correction duty ratio.

A twelfth aspect defines a control method of a conversion apparatus including a conversion module (e.g., an VCU 111 in an embodiment below) having two phases, each of which includes a converter capable of performing a voltage conversion of electric power discharged from or charged in a power source (e.g., a battery 105 in the embodiment below) and a sensor (e.g., a phase current sensors 1151 or 1152 in the embodiment below) for detecting a current value of a phase current flowing in the converter, in which the two phases are electrically connected in parallel, and
a controller (e.g., an ECU 113 or 213 in the embodiment below) for controlling the two converters respectively according to a control signal generated based on a predetermined duty ratio,
the method including:
determining a basic duty ratio that is common to the two phases so that an output of the conversion module becomes equal to a target voltage or a target current;
determining individual correction duty ratios with respect to the two converters based on a difference between two phase currents flowing in the two converters respectively, in which the correction duty ratio includes at least one positive value and at least one negative value and the absolute value of the correction duty ratio is equal to or less than the basic duty ratio; and
generating the control signal based on the basic duty ratio and the correction duty ratio.

Advantageous Effects of Invention

According to first, tenth, and eleventh aspects, since a correction duty ratio includes at least one positive value and at least one negative value for balancing phase currents of a plurality of phases, when the entire conversion module including the plurality of phases is considered as one unit, the correction duty ratio of each phase is canceled out. Therefore, in a state in which the influence of the correction duty ratio on the control based on the basic duty ratio for voltage conversion is reduced, a drift current of phase currents between the plurality of phases can be reduced. That is, the drift current of the phase currents between the plurality of phases can be reduced without affecting the efficiency of the voltage conversion that is the original function of the conversion module by the correction duty ratio.

According to the second aspect, since the absolute value of a sum of the correction duty ratios is equal to or less than a predetermined value, when the entire conversion module is considered as one unit, the correction duty ratios of respective phases can be effectively canceled out. Therefore, in a state in which the influence of the correction duty ratio on the control based on the basic duty ratio for voltage conversion is reduced, a drift current of phase currents between the plurality of phases can be reduced.

According to the third aspect, since the sum of the correction duty ratios is 0, when the entire conversion module is considered as one unit, the correction duty ratios of the respective phases can be more effectively canceled out. Therefore, in a state in which the influence of the correction duty ratio on the control based on the basic duty ratio for voltage conversion is reduced, a drift current of phase currents between the plurality of phases can be reduced.

According to the fourth aspect, since the correction duty ratio that is determined by the second determination unit is within an upper limit or a lower limit whose absolute value is smaller than the basic duty ratio, the control of the conversion module according to an excessive correction duty ratio due to an error, or the like included in a detection value of a current sensor can be reduced.

According to the fifth aspect, the second determination unit determines the absolute value of an upper limit or a lower limit of the correction duty ratio by setting a value equal to or greater than the maximum value of the correction duty ratio as the upper limit, in which the correction duty ratio is determined in order to reduce the drift current of each phase generated in a state where all of the sensors are normal. Therefore, the control of the conversion module by the correction duty ratio determined by the second determination unit is performed to the maximum within a range in which an extreme drift current does not occur between the plurality of phases.

According to the sixth aspect, the second determination unit determines the absolute value of the upper limit or the lower limit of the correction duty ratio by setting a value equal to or less than the minimum value of the correction duty ratio as the upper limit, in which the correction duty ratio is determined in order to reduce the drift current of each phase generated in a state where some of the sensors are abnormal. That is, when a detection value of a broken sensor indicates an abnormal value, the upper limit of the correction duty ratio determined by the second determination unit is the maximum value at which a normal phase current does not become an overcurrent along with the abnormal value. Since the correction duty ratio determined by the second determination unit is equal to or less than the corresponding upper limit, even when the detection value of the broken sensor indicates the abnormal value, the excessive control of the conversion module by the correction duty ratio is not performed and the normal phase current does not become the overcurrent.

According to the seventh aspect, the second determination unit determines the absolute value of the upper limit or the lower limit of the correction duty ratio to be equal to or greater than the maximum value of the correction duty ratio that is determined to reduce the drift current of each phase generated in a state where all of the sensors are normal, and determines, as an upper limit, a value equal to or less than the minimum value of the correction duty ratio that is determined to reduce the drift current of each phase generated in a state where some of the sensors are abnormal. Therefore, even when the detection value of a broken sensor indicates an abnormal value, excessive control of the conversion module by the correction duty ratio is not performed, and when all of the sensors are normal, the conversion module is controlled to the maximum within a range in which an extreme drift current does not occur between the plurality of phases.

According to the eighth aspect, since the absolute value of the upper limit or the lower limit of the correction duty ratio determined by the second determination unit is a value close to the maximum value of the correction duty ratio that is determined to reduce the drift current of each phase generated when all of the sensors are normal, the conversion module can be controlled to the maximum within a range in which an extreme drift current does not occur between the plurality of phases while taking measures against an error that is included in each detection value even when all of the sensors are normal.

According to the ninth, tenth, and twelfth aspects, since the correction duty ratio includes a positive value and a negative value for balancing the phase currents between two phases, the correction duty ratios of the respective phases can be canceled out when the entire conversion module including the two phases is considered as one unit. Therefore, in a state in which the influence of the correction duty ratio on the control based on the basic duty ratio for voltage conversion is reduced, a drift current of phase currents between the two phases can be reduced. That is, the drift current of the phase current between the two phases can be reduced without affecting the efficiency of the voltage conversion that is the original function of the conversion module by the correction duty ratio.

DESCRIPTION OF EMBODIMENTS

Hereinafter, embodiments of the invention will be described with reference to the drawings.

First Embodiment

Figure 1:
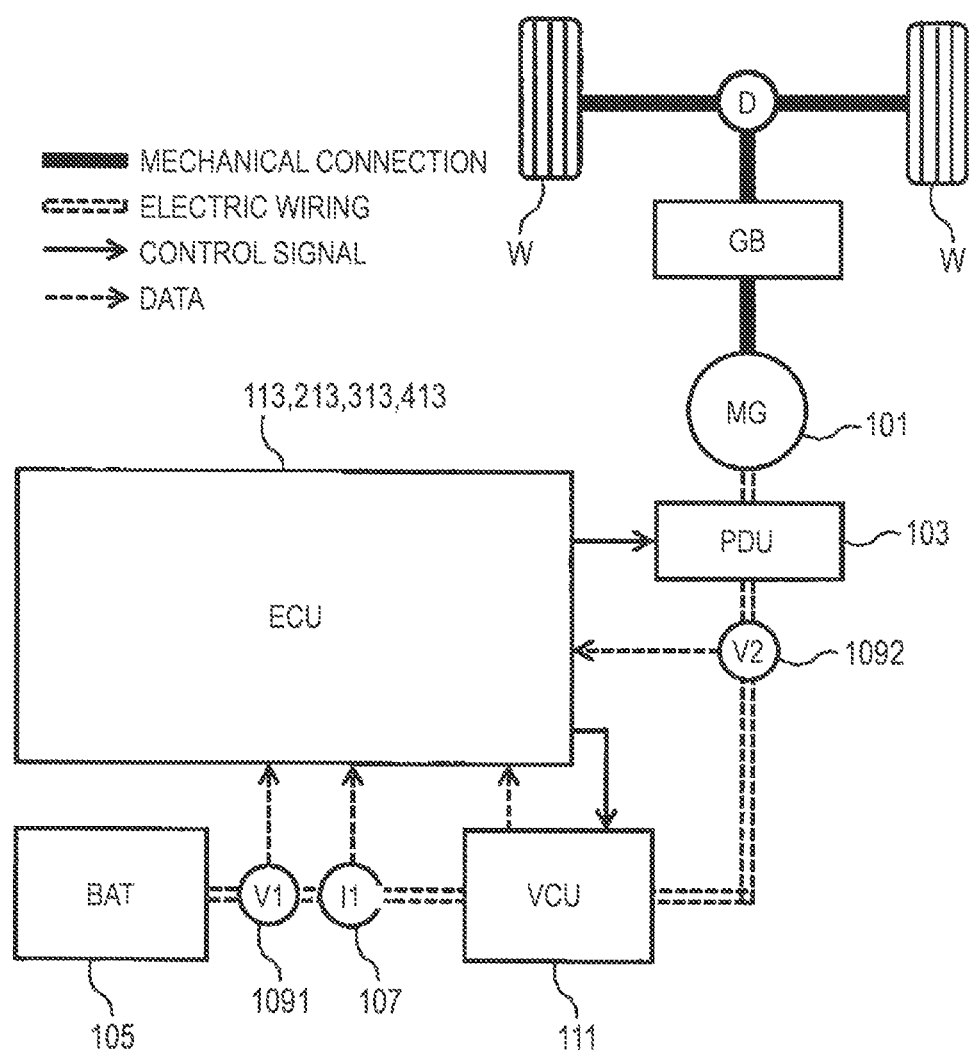
FIG. 1 is a block diagram illustrating a schematic configuration of an electric vehicle equipped with a conversion apparatus according to one embodiment of the present invention.

FIG. 1 is a block diagram illustrating a schematic configuration of an electric vehicle equipped with a conversion apparatus according to one embodiment of the present invention. In FIG. 1, a bold solid line indicates a mechanical connection, a double-dashed line indicates an electric wiring, a thin solid arrow indicates a control signal, and a thin dashed arrow indicates data such as a detection value. A 1MOT type electric vehicle illustrated in FIG. 1 includes a motor generator (MG) 101, a power drive unit (PDU) 103, a battery (BAT) 105, a current sensor 107, voltage sensors 1091 and 1092, a voltage control unit (VCU) 111, and an electronic control unit (ECU) 113. A phase current sensor, which is described later and included in the current sensor 107 and the VCU 111, is a so-called hall-type current sensor that does not have an electrical contact (node) with a circuit that is a current detection target. Each current sensor includes a core and a hall element, and a magnetic field proportional to an input current generated in a gap of the core is converted into a voltage by the hall element that is a magnetoelectric conversion element.

Hereinafter, components of the electric vehicle will be described below.

The motor generator 101 is driven by electric power supplied from the battery 105 to generate a driving power for the electric vehicle to travel. A torque generated by the motor generator 101 is transmitted to a drive wheel W via a gearbox GB including a speed shift stage or a fixed stage, and a differential gear D. The motor generator 101 operates as a power generator at a time of decelerating the electric vehicle to output a braking force of the electric vehicle. Also, a regenerative power which is generated by operating the motor generator 101 as the power generator may be stored in the battery 105.

The PDU 103 converts a direct current (DC) voltage to a three-phase alternating current (AC) voltage, and applies the voltage to the motor generator 101. Also, the PDU 103 converts an AC voltage input during a regeneration operation of the motor generator 101 into a DC voltage.

The battery 105 includes a plurality of power storage cells such as lithium-ion batteries, or nickel hydrogen batteries, and supplies high-voltage electric power to the motor generator 101 via the VCU 111. However, the battery 105 is not limited to a secondary battery such as a lithium ion battery, or a nickel hydrogen battery. For example, a condenser and a capacitor having a small chargeable capacity but being capable of charging and discharging a large amount of electric power within a short period of time may be used as the battery 105.

The current sensor 107 detects an input current I1 to the VCU 111, that is, an output current of the battery 105. The voltage sensor 1091 detects an input voltage V1 of the VCU 111, that is, an output voltage of the battery 105. The voltage sensor 1092 detects an output voltage V2 of the VCU 111.

The VCU 111 is a so-called multi-phase converter including two converters capable of performing a voltage conversion of the electric power discharged from the battery 105 or the electric power charged in the battery 105, in which the two converters are connected to each other in parallel to have an output node and an input node in common. The VCU 111 boosts the output voltage of the battery 105 with the DC maintained. The VCU 111 steps down the electric power generated by the motor generator 101 and converted into the DC during the deceleration of the electric vehicle. The electric power stepped down by the VCU 111 is charged in the battery 105.

Figure 2:
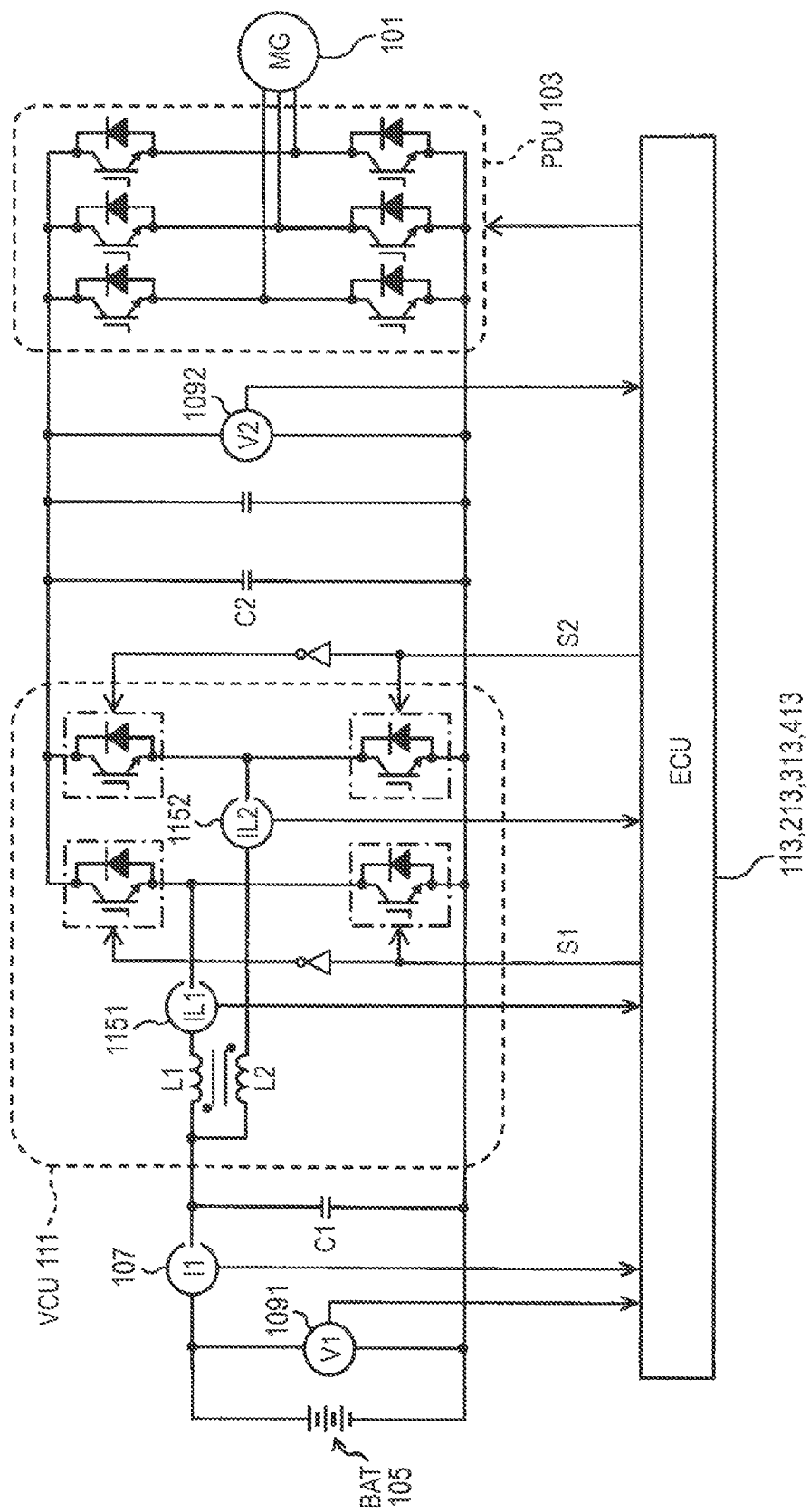
FIG. 2 is an electric circuit diagram illustrating a relationship among a battery, a VCU, a PDU, a motor generator, and an ECU according to an embodiment of the present invention.

FIG. 2 is an electric circuit diagram illustrating a relationship among the battery 105, the VCU 111, the PDU 103, the motor generator 101, and the ECU 113. As illustrated in FIG. 2, each converter in the VCU 111 includes a reactor, and has a set of a diode and a switching element connected in parallel respectively to a high-side and a low-side of the reactor to configure a boosting chopper circuit. Further, the VCU 111 includes phase current sensors 1151 and 1152 that respectively detect current values of phase currents IL1 and IL2 flowing in the two converters. A smoothing condenser C1 is provided in parallel with the two converters on an input side of the VCU 111 and a smoothing condenser C2 is provided on an output side of the VCU 111.

The two converters included in the VCU 111 is electrically connected in parallel with each other, and the ECU 113 performs on and off switching control of two switching elements having a high-side and a low-side at a desired timing, thereby performing a voltage conversion in each of the converters. The on and off switching operation of the switching element in the converter is controlled by a control signal (pulse width modulation (PWM) signal) that is generated by the ECU 113 to have a predetermined duty ratio of a pulse shape. The on and off switching control in each converter is an interleaving control which shifts the on and off switching phases by 180 degrees according to the control signal from the ECU 113.

Figure 3:
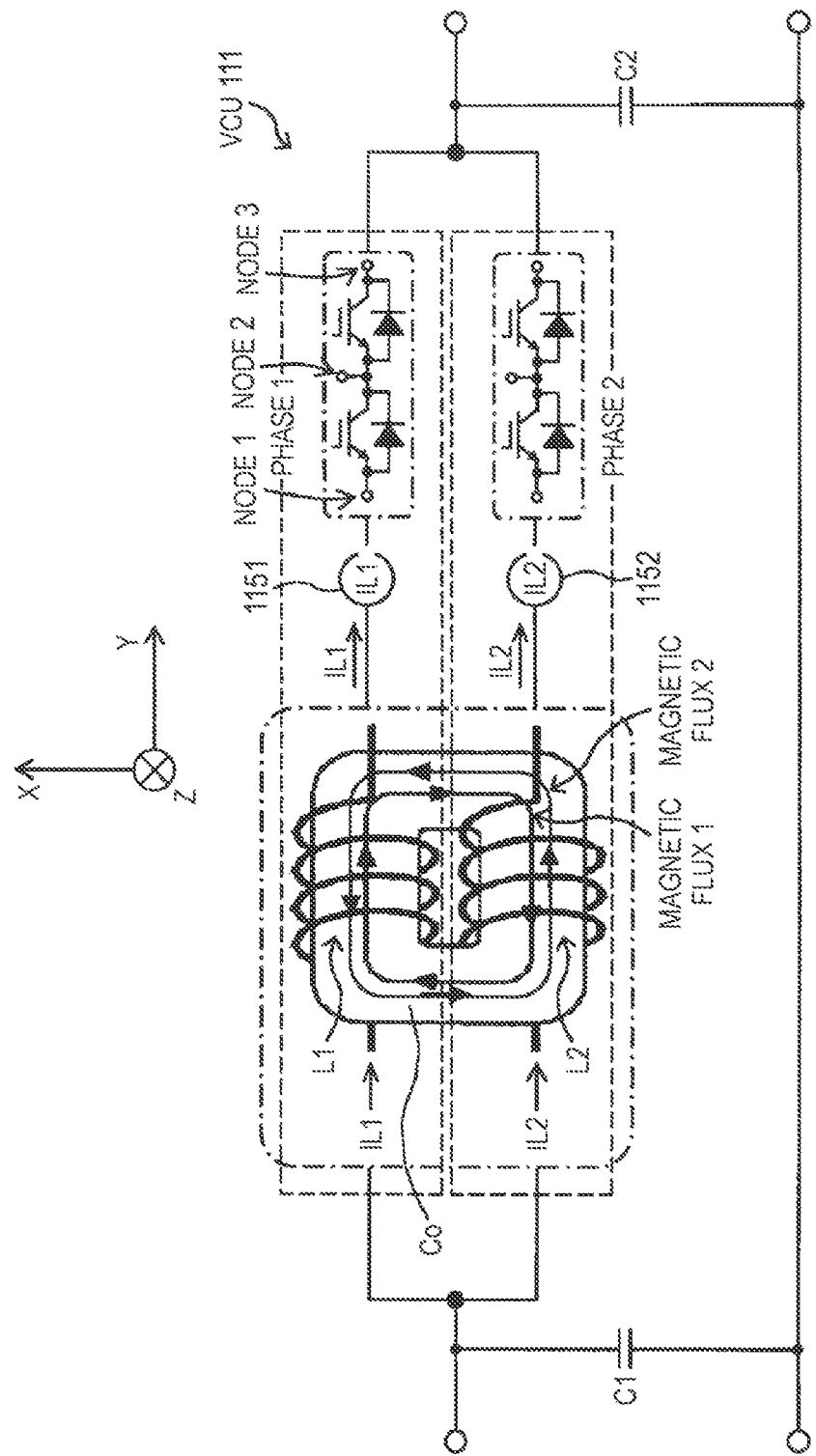
FIG. 3 is a diagram illustrating a positional relationship viewed from a Z-axis direction among components of two converters (phases) included in the VCU illustrated in FIG. 2, and a smoothing condenser.

FIG. 3 is a diagram illustrating a positional relationship viewed from a Z-axis direction among the components in each of the two converters of the VCU 111 illustrated in FIG. 2 and the smoothing condensers C1 and C2. In the description provided below, a set of the converter and the phase current sensor included in the VCU 111 is referred to as a "phase". Therefore, according to the present embodiment, a set of the converter including a reactor L1 and the phase current sensor 1151 is referred to as "phase" and a set of the converter including a reactor L2 and the phase current sensor 1152 is referred to as "phase 2" as illustrated in FIG. 3.

As illustrated in FIG. 3, according to the present embodiment, the phase 1 and the phase 2 are arranged in a row on an XY plane. An iron core of the reactor L1 constituting the phase 1 and an iron core of the reactor L2 constituting the phase 2 are shared, and thus winding directions of coils in the respective reactors with respect to the iron core are opposite to each other. Therefore, the reactor L1 and the reactor L2 are magnetically coupled to each other. An iron core Co shared by the reactor L1 and the reactor L2 is arranged over the phase 1 and the phase 2 on the XY plane. The XY plane may be either a horizontal plane or a vertical plane.

In FIG. 3, when the same current flows in the reactors that are magnetically coupled to each other, magnetic fluxes generated by the respective reactors are offset each other. An electric current IL1 flowing in the reactor L1 generates a magnetic flux 1 and an electric current IL2 flowing in the reactor L2 generates a magnetic flux 2 through electromagnetic induction, respectively. As described above, since the iron core of the reactor L1 and the iron core of the reactor L2 are shared, the magnetic flux 1 and the magnetic flux 2 are in opposite directions, thereby canceling out each other. Therefore, magnetic saturation of the reactor L1 and the reactor L2 can be prevented.

Induced currents IL1 and IL2 in the reactors L1 and L2 of the phases are input to a node Node2 that connects one end of the switching element on the low-side to one end of the switching element on the high-side. A node Node1 of the other end of the switching element at the low-side is connected to a ground wire. In addition, an output current of each phase is output from a node Node3 of the other end of the switching device at the high-side.

Figure 4:
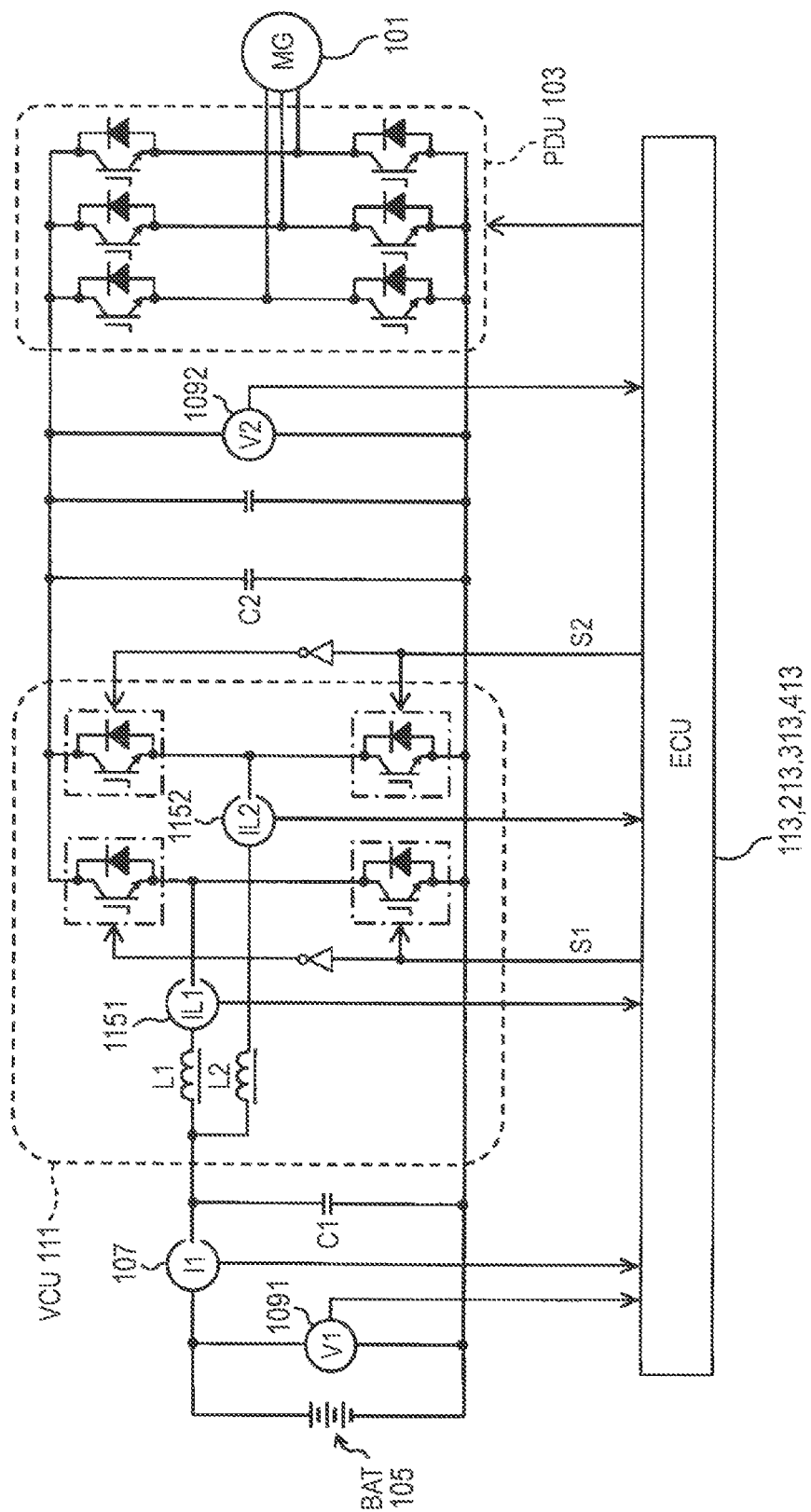
FIG. 4 is an electric circuit diagram illustrating a relationship among a battery, a VCU, a PDU, a motor generator, and an ECU according to another embodiment of the present invention.
Figure 5:
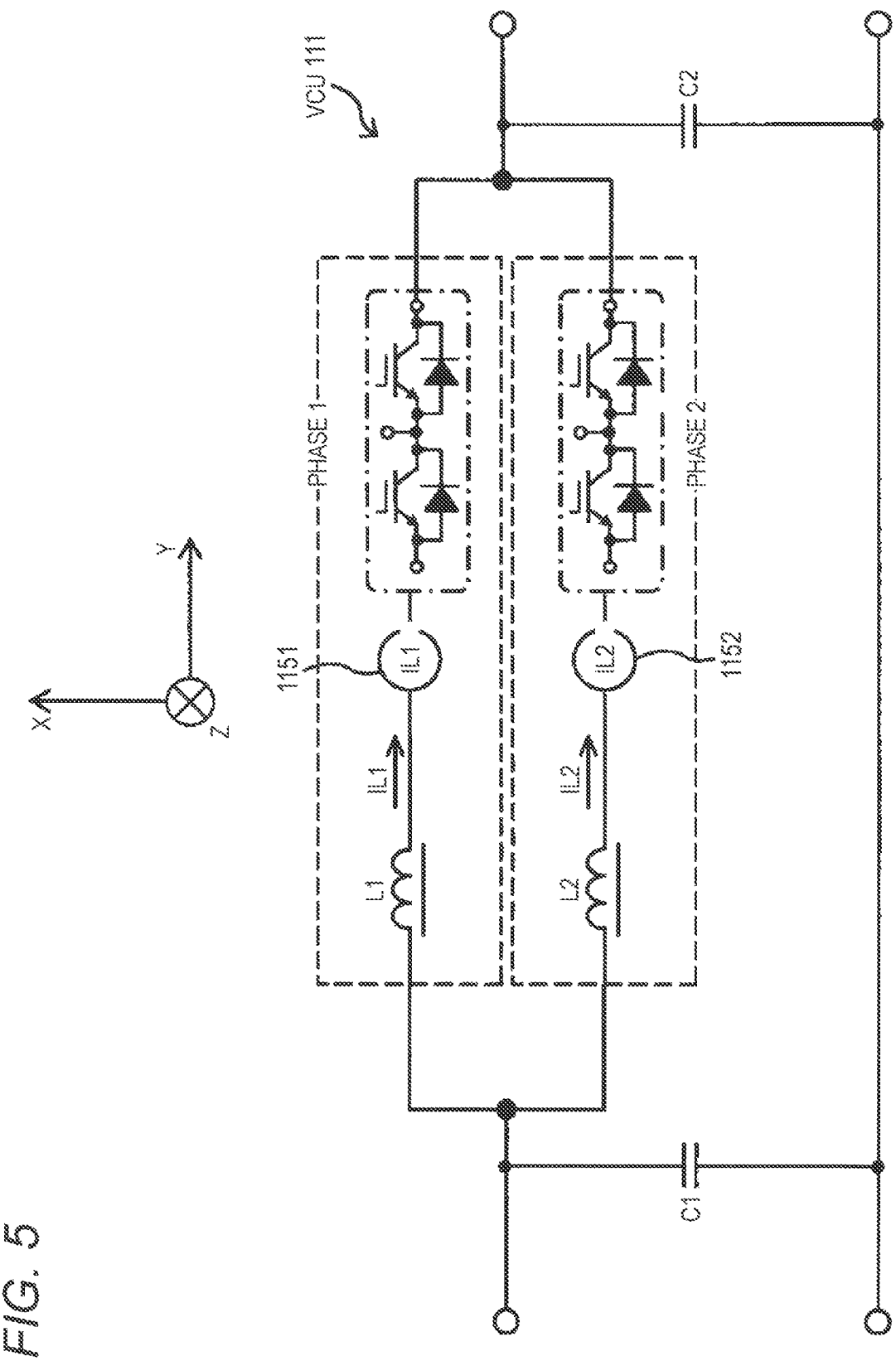
FIG. 5 is a diagram illustrating a positional relationship viewed from a Z-axis direction among components of two converters (phases) included in the VCU illustrated in FIG. 4, and a smoothing condenser.

As illustrated in FIG. 4, the iron cores of the reactors respectively constituting the phase 1 and the phase 2 may be separately configured. However, even in this case, the phase 1 and the phase 2 are arranged in a row on the XY plane as illustrated in FIG. 5.

The ECU 113 performs the on and off switching control according to the control signal supplied to the switching elements of the two phases constituting the VCU 111, and performs the control of the PDU 103. Hereinafter, the control of the VCU 111 by the ECU 113 will be described in detail with reference to FIGS. 6 to 8.

Figure 6:
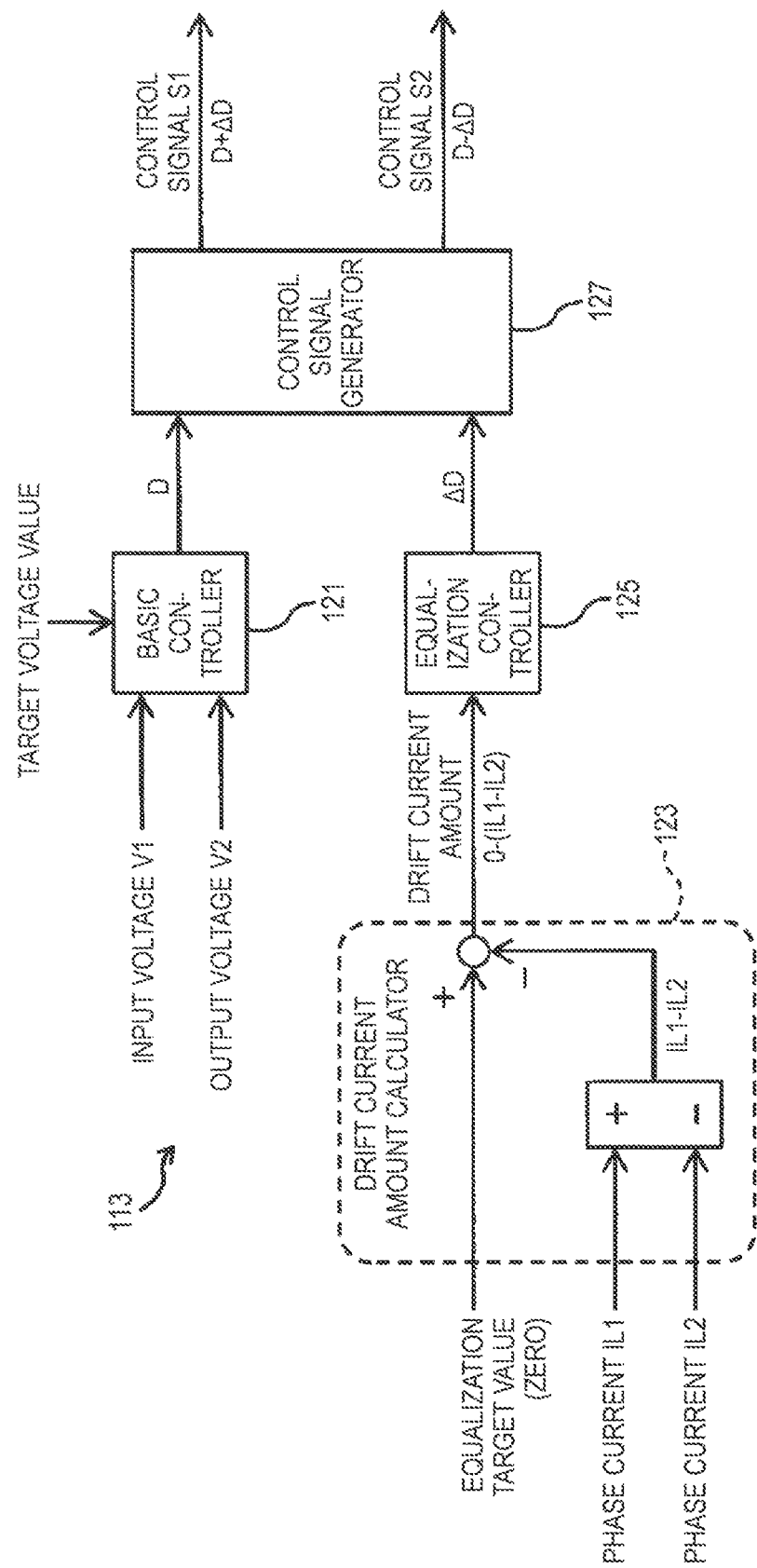
FIG. 6 is a block diagram of an internal structure of the ECU according to a first embodiment.

FIG. 6 is a block diagram of an internal configuration of the ECU 113 according to the first embodiment. As illustrated in FIG. 6, the ECU 113 according to the first embodiment includes a basic controller 121, a drift current amount calculator 123, an equalization controller 125, and a control signal generator 127. The basic controller 121 is a unit that performs the control for setting an input or an output of the VCU 111 as a target value, the drift current amount calculator 123 and the equalization controller 125 are units that perform the control for equalizing the phase currents flowing in two converters constituting the VCU 111, and the control signal generator 127 is a unit that generates a pulse-shaped control signal corresponding to both of the two types of controls having different purposes.

Hereinafter, components of the ECU 113 according to the first embodiment will be described below.

The basic controller 121 determines a basic duty ratio D of a control signal with respect to the switching element in each converter constituting the VCU 111 for setting the input voltage V1 or the output voltage V2 as a target voltage value, based on the input voltage V1 of the VCU 111 detected by the voltage sensor 1091, the output voltage V2 of the VCU 111 detected by the voltage sensor 1092, and the target voltage value. The basic controller 121 may also determine the basic duty ratio D of the control signal with respect to the switching element in each converter constituting the VCU 111 for setting an input current I1 to the VCU 111 as a target current value, based on the input current I1 to the VCU 111 detected by the current sensor 107 and the target current value.

The drift current amount calculator 123 calculates a difference (IL1−IL2) between the phase currents IL1 and IL2 of the respective phases in the VCU 111 detected respectively by the phase current sensors 1151 and 1152, and calculates a difference between the above difference and an equalization target value as a drift current amount. Also, the equalization target value is generally 0 (zero) [A], unless there is a specific reason, such as biasing one phase current. Therefore, the drift current amount calculator 123 calculates "IL2−IL1 (=0−(IL1−IL2))" as the drift current amount.

The equalization controller 125 determines a correction duty ratio ΔD that is added to or subtracted from the basic duty ratio D of the control signal for equalizing the phase currents IL1 and IL2, based on the drift current amount calculated by the drift current amount calculator 123. That is, the equalization controller 125 separately determines a correction duty ratio "+ΔD" having a positive value and a correction duty ratio "−ΔD" having a negative value, in which absolute values of the correction duty ratios are equal to each other.

Figure 7:
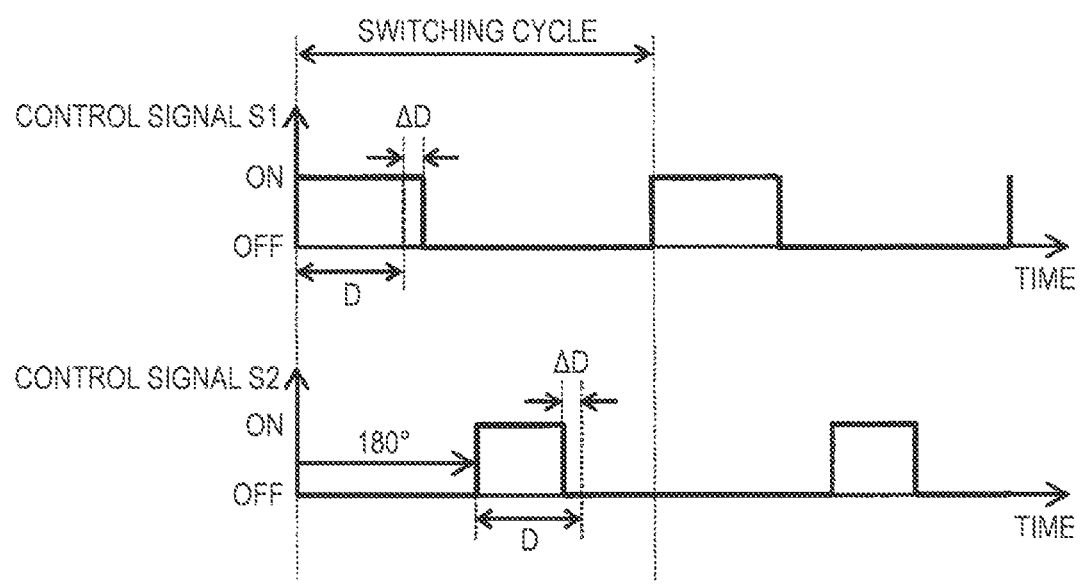
FIG. 7 is a diagram illustrating an example of a change over time in two types of control signals generated by a control signal generator.

The control signal generator 127 generates two types of control signals S1 and S2 based on the basic duty ratio D determined by the basic controller 121 and the correction duty ratio ΔD determined by the equalization controller 125. FIG. 7 is a diagram illustrating an example of a change over time in the control signals S1 and S2 generated by the control signal generator 127. As illustrated in FIG. 7, the control signal generator 127 generates the control signal S1 having a duty ratio of "D+ΔD" and the control signal S2 having a duty ratio of "D−ΔD". As illustrated in FIG. 2 or 4, one of the two types of control signals S1 and S2 generated by the control signal generator 127 is supplied to the switching element in one of the two converters constituting the VCU 111 and the other control signal is supplied to the switching element of the other converter.

Figure 8:
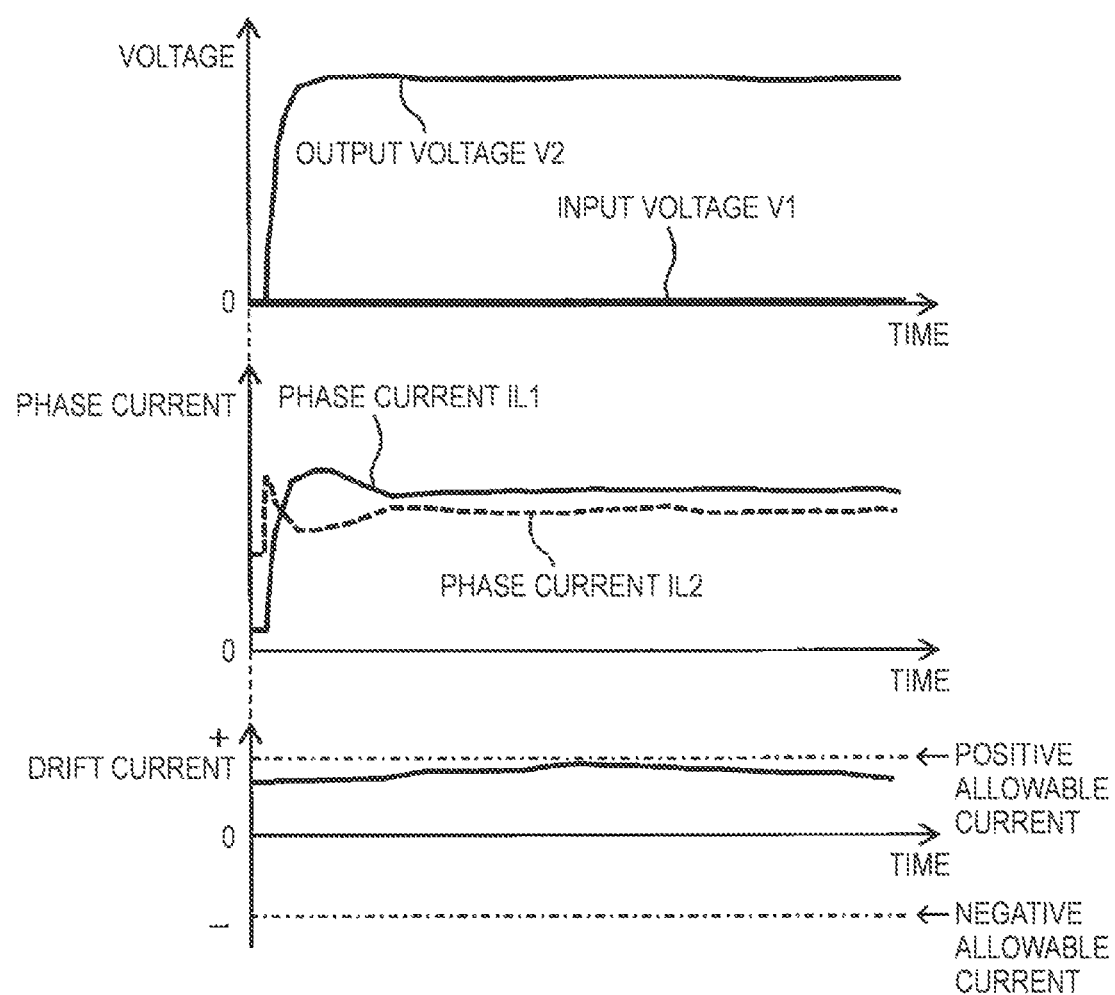
FIG. 8 is a diagram illustrating an example of change over time in a phase current and a drift current amount flowing in each converter when the VCU boosts an input voltage to an output voltage.

Since the switching element in the respective converters constituting the VCU 111 are on and off switching controlled according to the control signals S1 and S2 described above, the VCU 111 performs a voltage conversion reflecting two types of controls including a control for setting an input or an output as a target value and a control for equalizing the phase currents IL1 and IL2. As a result, as illustrated in FIG. 8, the drift current amount indicated as a difference between the phase currents IL1 and IL2 flowing in the respective converters is reduced to a predetermined value or less when the VCU 111 boosts the input voltage V1 to the output voltage V2.

As described above, according to the present embodiment, the correction duty ratios for balancing the phase currents between the two phases include the positive value +ΔD and the negative value −ΔD which have the same absolute values as each other and a sum of the correction duty ratios having the positive value and the negative value is 0. Therefore, when the VCU 111 including the two phases is considered as one unit, the correction duty ratio ΔD of each phase is effectively canceled out. Thus, in a state where the influence of the correction duty ratio ΔD on the control based on the basic duty ratio D for the voltage conversion is prevented, the drift current of the phase currents between the two phases can be reduced. That is, in a state where the correction duty ratio ΔD does not affect the efficiency of the voltage conversion that is the original function of the VCU 111, the drift current of the phase currents between the two phases can be reduced. In addition, the sum of the correction duty ratios having the positive value and the negative value is not limited to 0, that is, the absolute value of the sum may be equal to or less than a predetermined value. Even in this case, since the correction duty ratios ΔD of the respective phases are effectively canceled out, the drift current of the phase currents between the two phases can be reduced in a state where the correction duty ratio ΔD does not affect the efficiency of the voltage conversion that is the original function of the VCU 111.

Second Embodiment

A different point that an electric vehicle according to a second embodiment from the electric vehicle according to the first embodiment is the internal configuration of the ECU, and the other components are the same as those of the first embodiment. Therefore, descriptions about the same components as those of the first embodiment except for the ECU will be simplified or omitted.

Figure 9:
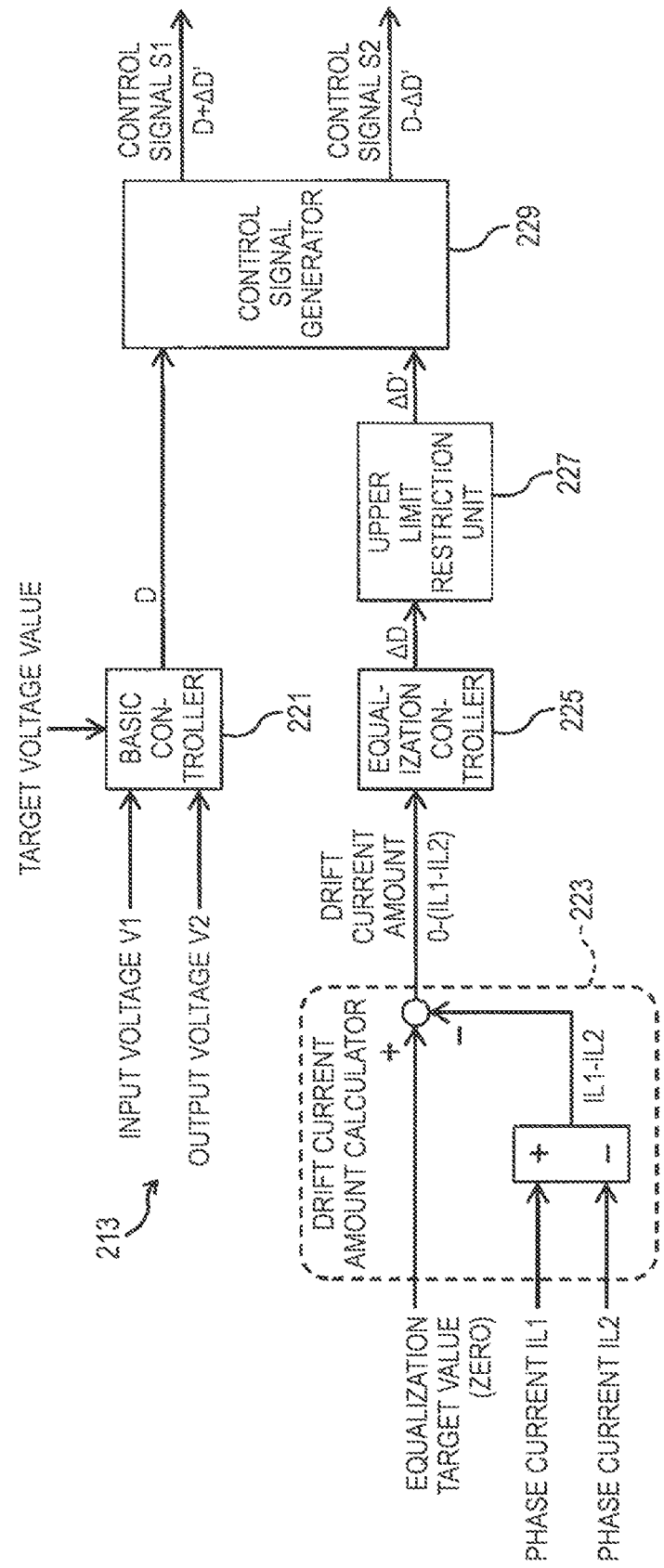
FIG. 9 is a block diagram of an internal configuration of an ECU according to a second embodiment.

FIG. 9 is a block diagram illustrating an internal configuration of an ECU 213 according to the second embodiment. In FIG. 9, the same components as those of FIG. 6 of the first embodiment are denoted by the same reference numerals. As illustrated in FIG. 9, the ECU 213 according to the second embodiment includes a basic controller 221, a drift current amount calculator 223, an equalization controller 225, an upper limit restriction unit 227, and a control signal generator 229. The basic controller 221 is a unit that performs the control for setting an input or an output of the VCU 111 as a target value, the drift current amount calculator 223, the equalization controller 225, and the upper limit restriction unit 227 are units that perform the control for equalizing the phase currents flowing in two converters constituting the VCU 111, and the control signal generator 229 is a unit that generates a pulse-shaped control signal corresponding to both of the two controls having different purposes.

Next, the components included in the ECU 213 according to the second embodiment will be described below.

The basic controller 221 determines a basic duty ratio D of a control signal with respect to the switching element in each converter constituting the VCU 111 for setting an input voltage V1 or an output voltage V2 as a target voltage value, based on the input voltage V1 of the VCU 111 detected by the voltage sensor 1091, the output voltage V2 of the VCU 111 detected by the voltage sensor 1092, and the target voltage value. Alternately, the basic controller 221 may determine the basic duty ratio D of the control signal with respect to the switching element of each converter constituting the VCU 111 for setting an input current I1 as a target current value, based on the input current I1 to the VCU 111 detected by the current sensor 107, and the target current value.

The drift current amount calculator 223 calculates a difference (IL1−IL2) between the phase currents IL1 and IL2 of the respective phases in the VCU 111, which are detected respectively by the phase current sensors 1151 and 1152, and calculates a difference between the above difference and an equalization target value as a drift current amount. Also, the equalization target value is generally 0 (zero) [A], unless there is a specific reason, such as, biasing one phase current. Therefore, the drift current amount calculator 223 calculates "IL2−IL1 (=0−(IL1−IL2))" as the drift current amount.

The equalization controller 225 determines a correction duty ratio ΔD that is added to or subtracted from the basic duty ratio D of the control signal for equalizing the phase currents IL1 and IL2, based on the drift current amount calculated by the drift current amount calculator 223. That is, the equalization controller 225 separately determines a correction duty ratio "+ΔD" having a positive value and a correction duty ratio "−ΔD" having a negative value, in which absolute values of the correction duty ratios are equal to each other.

When an absolute value |ΔD| of the correction duty ratio ΔD determined by the equalization controller 225 is a value exceeding an upper limit ΔDlim that is set to a value less than the basic duty ratio D in advance, the upper limit restriction unit 227 outputs the upper limit ΔDlim processed with the upper limit as a correction duty ratio ΔD', and when the absolute value |ΔD| is equal to or less than the upper limit ΔDlim, the upper limit restriction unit 227 outputs the correction duty ratio ΔD determined by the equalization controller 225 as the correction duty ratio ΔD'.

Figure 10:
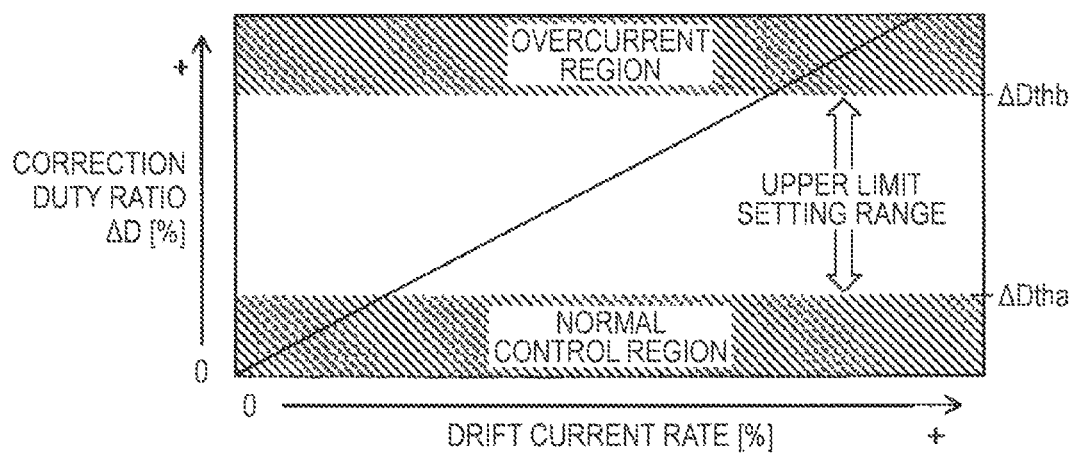
FIG. 10 is a diagram illustrating an upper limit setting range of a correction duty ratio pre-set in an upper limit restriction unit.

The upper limit ΔDlim of the absolute value of the correction duty ratio ΔD pre-set by the upper limit restriction unit 227 is a value equal to or greater than a maximum value ΔDtha of the correction duty ratio ΔD to be determined by the equalization controller 225 when the VCU 111 normally operates, and a value equal to or less than a minimum value ΔDthb of the correction duty ratio ΔD to be determined by the equalization controller 225 when at least one of the phase current sensors included in the VCU 111 is abnormal. That is, the upper limit ΔDlim of the absolute value of the correction duty ratio ΔD is set to a predetermined value within an upper limit setting range indicated in FIG. 10. In addition, the predetermined value is closer to the maximum value ΔDtha than to the minimum value ΔDthb.

The control signal generator 229 generates two types of control signals S1 and S2, that is, the control signal S1 having the duty ratio D+ΔD' and the control signal S2 having the duty ratio D−ΔD', based on the basic duty ratio D determined by the basic controller 221 and the correction duty ratio ΔD' output by the upper limit restriction unit 227. As indicated in FIG. 2 or 4, one of the two types of control signals S1 and S2 generated by the control signal generator 229 is supplied to the switching element in one of the two converters constituting the VCU 111 and the other is supplied to the switching element of the other converter.

Since the switching elements in the respective converters constituting the VCU 111 are on and off-switching controlled according to the control signals S1 and S2 described above, the VCU 111 performs a voltage conversion reflecting two types of controls including a control for setting an input or an output as a target value, and a control for equalizing the phase currents IL1 and IL2. As a result, the drift current amount indicated as a difference between the phase currents IL1 and IL2 flowing in the respective converters is reduced to a predetermined value or less when the VCU 111 boosts the input voltage V1 to the output voltage V2.

As described above, according to the present embodiment, since the absolute value of the correction duty ratio ΔD' included in the duty ratio of the control signals S1 and S2 generated by the control signal generator 229 is equal to or less than the upper limit that is less than the basic duty ratio D even when at least one of the phase current sensors included in the VCU 111 is abnormal, the control of the VCU 111 according to the excessive correction duty ratio ΔD caused by an error and the like included in the detection value of a broken phase current sensor can be prevented.

Also, the upper limit ΔDlim of the absolute value of the correction duty ratio ΔD pre-set in the upper limit restriction unit 227 is equal to or greater than the maximum value ΔDtha of the correction duty ratio ΔD that is determined in order to reduce the drift current of each phase generated in a state where all of the phase current sensors in the VCU 111 are normal. Therefore, when all the phase current sensors are normal, the VCU 111 is controlled to the maximum within a range in which an extreme drift current does not occur between the plurality of phases. In addition, the upper limit ΔDlim is a value equal to or less than the minimum value ΔDthb of the correction duty ratio ΔD that is determined in order to reduce the drift current of each phase generated in a state where some of the phase current sensors included in the VCU 111 are abnormal. That is, when the detection value of a broken phase current sensor indicates an abnormal value, the minimum value ΔDthb is a maximum value at which a normal phase current does not become an overcurrent along with the abnormal value. Therefore, even when the detection value of a broken phase current sensor indicates an abnormal value, the excessive control of the VCU 111 by the correction duty ratio ΔD is not performed, and the normal phase current does not reach the overcurrent.

Figure 11:
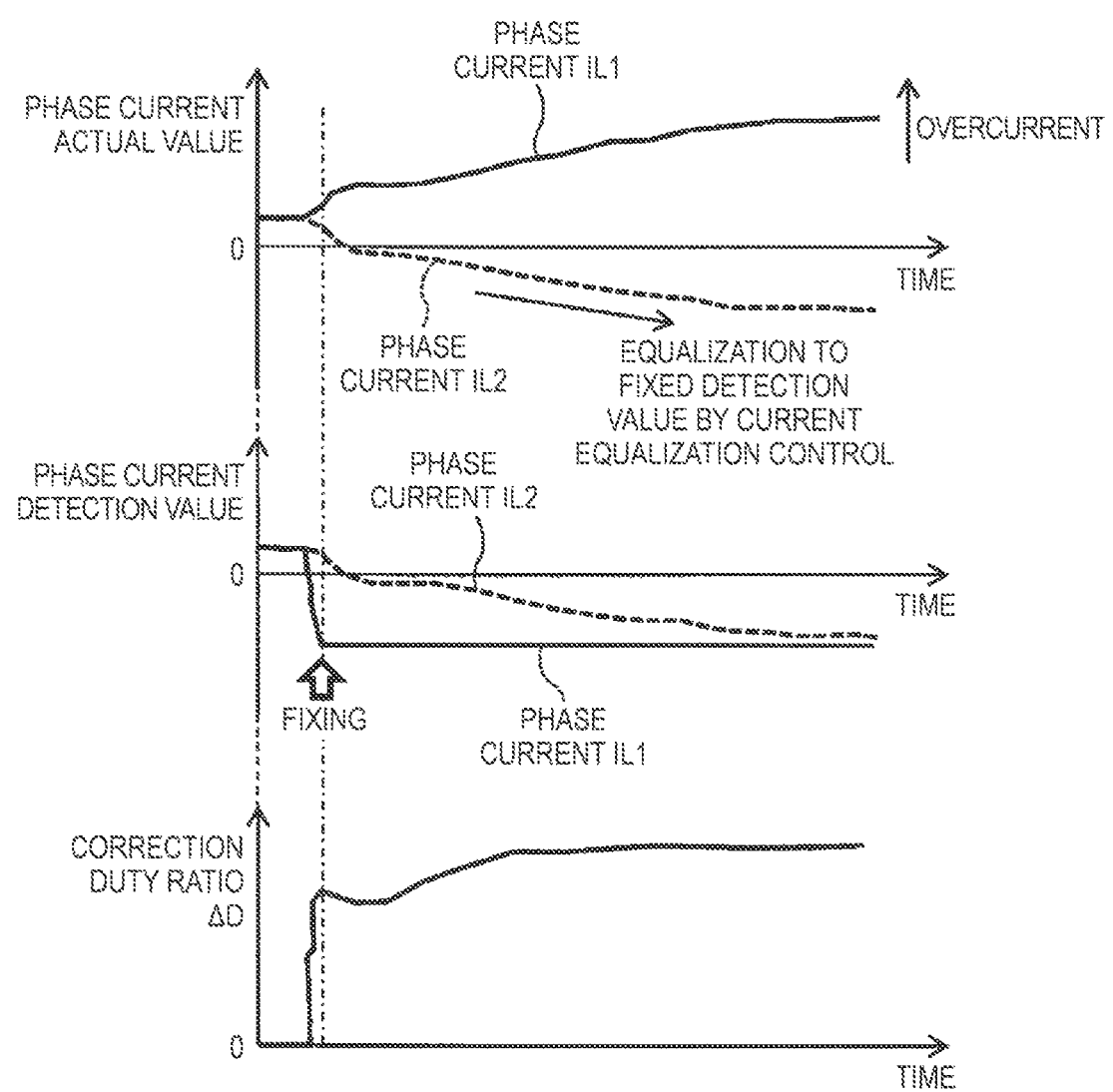
FIG. 11 is a diagram illustrating a change over time when a normal phase current follows an abnormal value that is a detection value of a broken phase current sensor to become an overcurrent.

Since some of the phase current sensors included in the VCU 111 are abnormal, if the control signal generator 229 determines the correction duty ratio ΔD of a value that is greater than the minimum value ΔDthb, and each converter in the VCU 111 is on and off-switching controlled by the control signal S1 having the duty ratio of "D+ΔD" and the control signal S2 having the duty ratio "D−ΔD" based on the correction duty ratio ΔD and the basic duty ratio D, as illustrated in FIG. 11, the normal phase current follows the abnormal value that is the detection value of the broken phase current sensor and becomes the overcurrent.

In addition, since the upper limit ΔDlim is a value that is close to the maximum value ΔDtha of the correction duty ratio ΔD that is determined to reduce the drift current of each phase obtained in a state where all of the phase current sensors are normal, it is possible to control the VCU 111 to the maximum within a range in which an extreme drift current does not occur between the plurality of phases while performing some measure against the error included in each detection value even when all the phase current sensors are normal.

Third Embodiment

A different point of an electric vehicle according to a third embodiment from the electric vehicle according to the first embodiment is an internal configuration of the ECU, and the other components are the same as those of the first embodiment. Therefore, descriptions of the same components as those of the first embodiment except for the ECU will be simplified or omitted.

Figure 12:
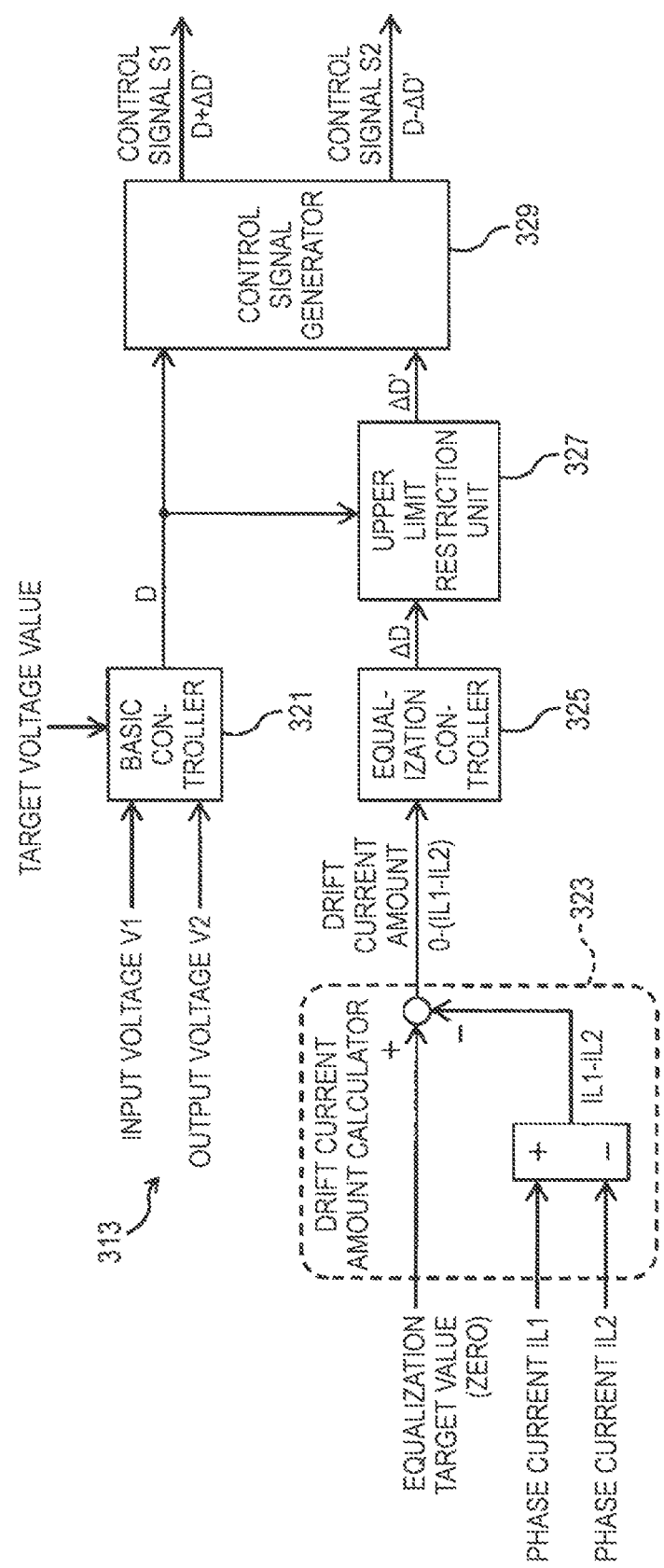
FIG. 12 is a block diagram of an internal structure of the ECU according to a third embodiment.

FIG. 12 is a block diagram illustrating an internal configuration of an ECU 313 according to the third embodiment. In FIG. 12, the same components as those of FIG. 6 of the first embodiment are denoted by the same reference numerals. As illustrated in FIG. 12, the ECU 313 according to the third embodiment includes a basic controller 321, a drift current amount calculator 323, an equalization controller 325, an upper limit restriction unit 327, and a control signal generator 329. The basic controller 321 is a unit that performs the control for setting an input or an output of the VCU 111 as a target value, the drift current amount calculator 323, the equalization controller 325, and the upper limit restriction unit 327 are units that perform the control for equalizing the phase currents flowing in two converters constituting the VCU 111, and the control signal generator 329 is a unit that generates a pulse-shaped control signal corresponding to both of the two controls having different purposes.

Next, the components included in the ECU 313 according to the third embodiment will be described below.

The basic controller 321 determines a basic duty ratio D of a control signal with respect to the switching element in each converter constituting the VCU 111 for setting an input voltage V1 or an output voltage V2 as a target voltage value, based on the input voltage V1 of the VCU 111 detected by the voltage sensor 1091, the output voltage V2 of the VCU 111 detected by the voltage sensor 1092, and the target voltage value. Alternately, the basic controller 321 may determine the basic duty ratio D of the control signal with respect to the switching element of each converter constituting the VCU 111 for setting an input current I1 as a target current value, based on the input current I1 to the VCU 111 detected by the current sensor 107, and the target current value.

The drift current amount calculator 323 calculates a difference (IL1−IL2) between the phase currents IL1 and IL2 of the respective phases in the VCU 111 detected respectively by the phase current sensors 1151 and 1152, and calculates a difference between the above difference and an equalization target value as a drift current amount. Also, the equalization target value is generally 0 (zero) [A], unless there is a specific reason, such as, biasing one phase current. Therefore, the drift current amount calculator 323 calculates "IL2−IL1 (=0−(IL1−IL2))" as the drift current amount.

The equalization controller 325 determines a correction duty ratio ΔD that is added to or subtracted from the basic duty ratio D of the control signal for equalizing the phase currents IL1 and IL2, based on the drift current amount calculated by the drift current amount calculator 323. That is, the equalization controller 325 separately determines a correction duty ratio +ΔD having a positive value and a correction duty ratio −ΔD having a negative value, in which absolute values of the correction duty ratios are equal to each other.

When the absolute value |ΔD| of the correction duty ratio ΔD determined by the equalization controller 325 is a value exceeding an upper limit ΔDlim that is set to a value less than the basic duty ratio D in advance, the upper limit restriction unit 327 outputs the upper limit ΔDlim processed with the upper limit as a correction duty ratio ΔD', and when the absolute value |ΔD| is a value equal to or less than the upper limit ΔDlim, the upper limit restriction unit 327 outputs the correction duty ratio ΔD determined by the equalization controller 325 as the correction duty ratio ΔD'.

Figure 13:
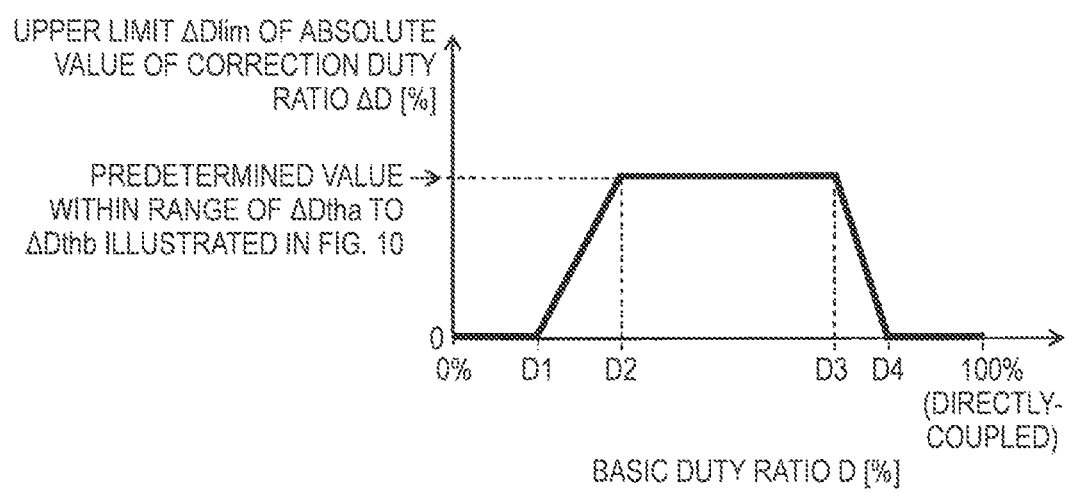
FIG. 13 is a diagram illustrating a relationship between a basic duty ratio and an upper limit of a correction duty ratio, in which the basic duty ratio is set by an upper limit restriction unit according to the third embodiment.

The upper limit ΔDlim of the absolute value of the correction duty ratio ΔD pre-set in the upper limit restriction unit 327 is set based on the basic duty ratio D determined by the basic controller 321. FIG. 13 is a diagram illustrating a relationship between the basic duty ratio D and the upper limit ΔDlim of the absolute value of the correction duty ratio ΔD, in which the relationship is set in the upper limit restriction unit 327 according to the third embodiment. In FIG. 13, values of the basic duty ratio D have a relationship of 0<D1<D2<D3<D4<100. When the basic duty ratio D is 0%, at least one of the converters constituting the VCU 111 is in a stop state, and when the basic duty ratio D is 100%, at least one of the converters constituting the VCU 111 is in a directly-coupled state.

The upper limit ΔDlim of the absolute value of the correction duty ratio ΔD is a maximum value at which the duty ratio of one of two converters included in the VCU 111 does not become 0% (stop state) or 100% (directly-coupled state) by the correction duty ratio ΔD. As illustrated in FIG. 13, the upper limit ΔDlim of the absolute value of the correction duty ratio ΔD according to the present embodiment is set to 0% when the basic duty ratio D is within a range of 0 to D1(%) and a range of D4 to 100(%), set to a value close to 0% as the basic duty ratio D becomes smaller when the basic duty ratio D is within a range of D1 to D2(%), set to a value close to 0% as the basic duty ratio D becomes greater when the basic duty ratio D is within a range of D3 to D4(%), and set to a value less than the pre-set basic duty ratio D when the basic duty ratio D is within a range of D2 to D3(%). The upper limit ΔDlim of the absolute value of the correction duty ratio ΔD set in a range in which the basic duty ratio D is within a range of D2 to D3(%) is a predetermined value within the upper limit setting range indicated in FIG. 10 described in the second embodiment. In addition, the upper limit ΔDlim is also a value equal to or greater than the maximum value ΔDtha of the correction duty ratio ΔD determined by the equalization controller 325 when the VCU 111 normally operates, and a value equal to or less than the minimum value ΔDthb of the correction duty ratio ΔD determined by the equalization controller 325 when at least one of the phase current sensors in the VCU 111 is abnormal. In addition, the predetermined value is a value closer to the maximum value ΔDtha than to the minimum value ΔDthb.

The control signal generator 329 generates two types of control signals S1 and S2, that is, the control signal S1 having the duty ratio D+ΔD' and the control signal S2 having the duty ratio D−ΔD', based on the basic duty ratio D determined by the basic controller 321 and the correction duty ratio ΔD' output by the upper limit restriction unit 327. One of the two types of control signals S1 and S2 generated by the control signal generator 329 is supplied to the switching element in one of the two converters constituting the VCU 111 and the other control signal is supplied to the switching element of the other converter.

Figure 14:
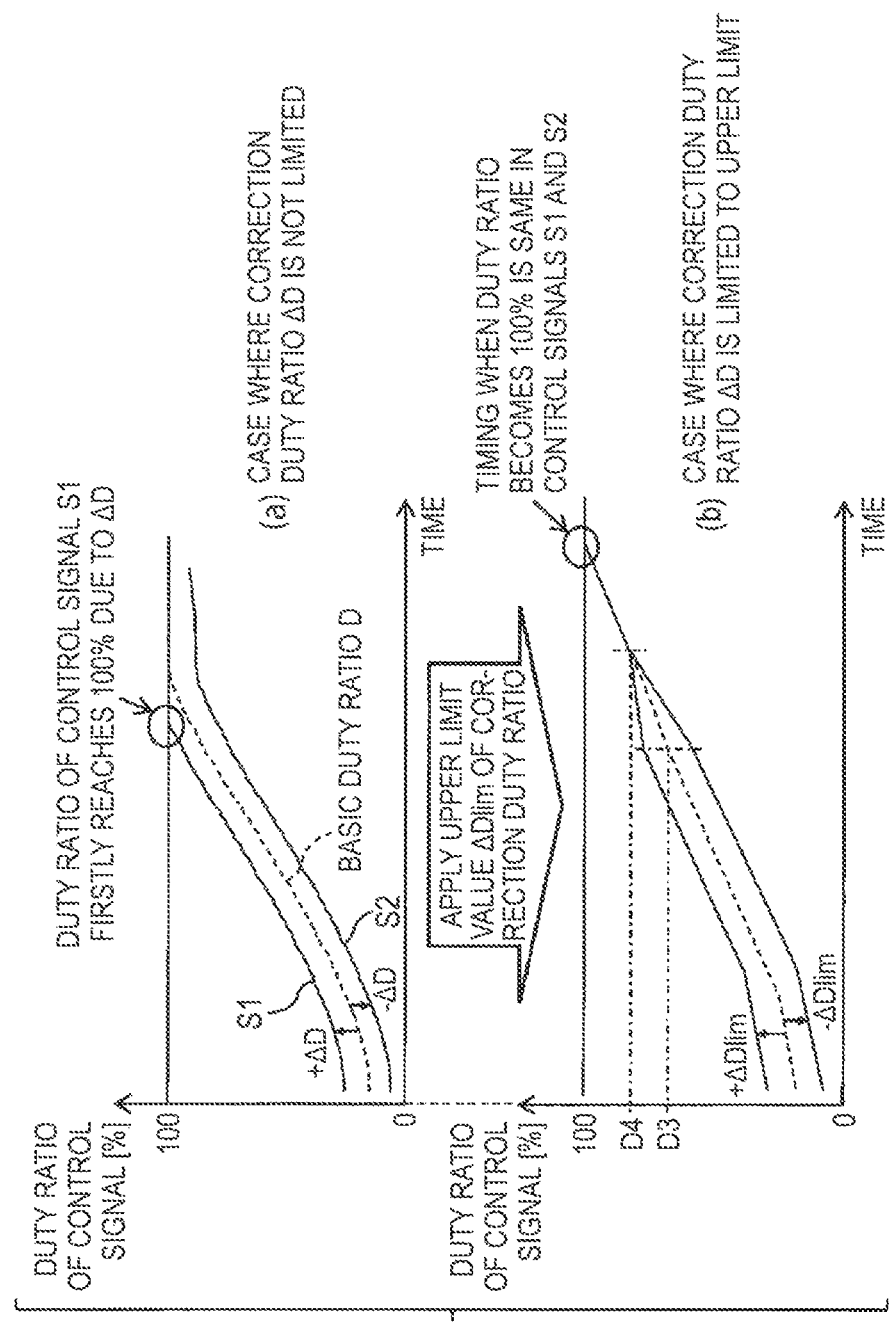
FIG. 14 is a diagram illustrating (a) an example of a change over time in each duty ratio of the control signal when the correction duty ratio is not restricted by the upper limit and (b) an example of a change over time in each duty ratio of the control signal when the correction duty ratio is restricted by the upper limit in the third embodiment, when the basic duty ratio is close to 100%.
Figure 15A:
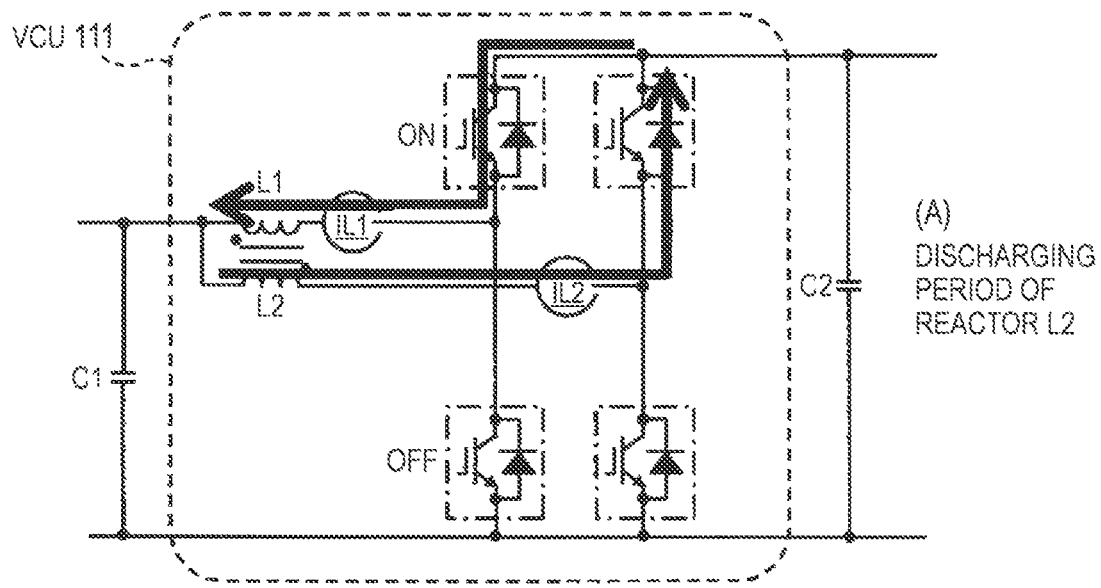
FIG. 15A is a diagram illustrating a state in which a circulating current of a direct current component that circulates within the VCU is generated.
Figure 15B:
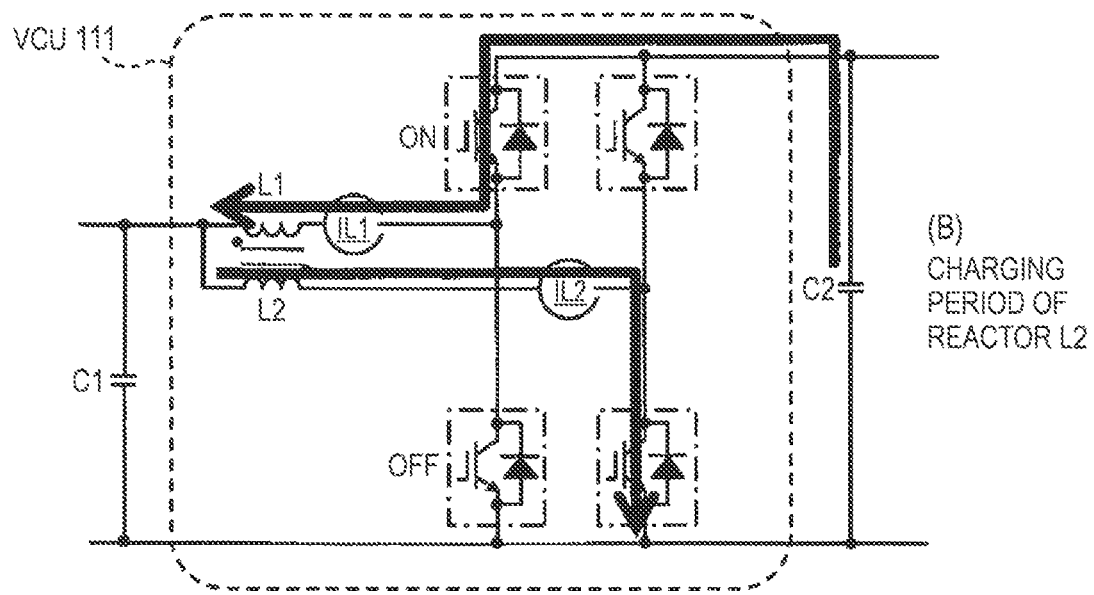
FIG. 15B is a diagram illustrating a state in which energy stored in a smoothing condenser flows toward the VCU.

FIG. 14 is a diagram illustrating, when the basic duty ratio D is close to 100%, (a) an example of a change over time in the duty ratios of the control signals S1 and S2 when the absolute value of the correction duty ratio ΔD is not limited to the upper limit ΔDlim, and (b) an example of a change over time in the duty ratios of the control signals S1 and S2 when the absolute value of the correction duty ratio ΔD is limited to the upper limit ΔDlim according to the third embodiment. In (a) of FIG. 14, since the correction duty ratio ΔD is not changed even when the basic duty ratio D is close to 100%, the duty ratio D+ΔD of the control signal S1 for the correction duty ratio ΔD firstly reaches 100%. In a state where the correction duty ratio D+ΔD of the control signal S1 has reached 100%, the converter to which the control signal S1 is supplied becomes the directly-coupled state. When one of the converters constituting the VCU 111 is in the directly-coupled state, during the discharging period of the reactor L2 in the other converter, as illustrated in FIG. 15A, a circulating current of a DC component, which circulates within the VCU 111, is generated and energy stored in the smoothing condenser C2 mostly flows to a side of the converter that is in the directly-coupled state. During the charging period of the reactor L2, as illustrated in FIG. 15B, the energy stored in the smoothing condenser C2 flows to the VCU 111 side. As such, when one of the converters in the VCU 111 is in the directly-coupled state, the energy is not efficiently used. Moreover, when the other converter continues to perform the voltage conversion in the directly-coupled state, there is a concern that the phase current for the control by the basic controller 321 reaches the overcurrent.

Regarding the above, when the upper limit ΔDlim of the absolute value of the correction duty ratio according to the present embodiment is applied, as indicated in (b) of FIG. 14, the correction duty ratios of the control signals S1 and S2 simultaneously reach 100%, the timing thereof is later than the timing when the correction duty ratio D+ΔD of the control signal S1 reaches 100% in (a) of FIG. 14.

Figure 16:
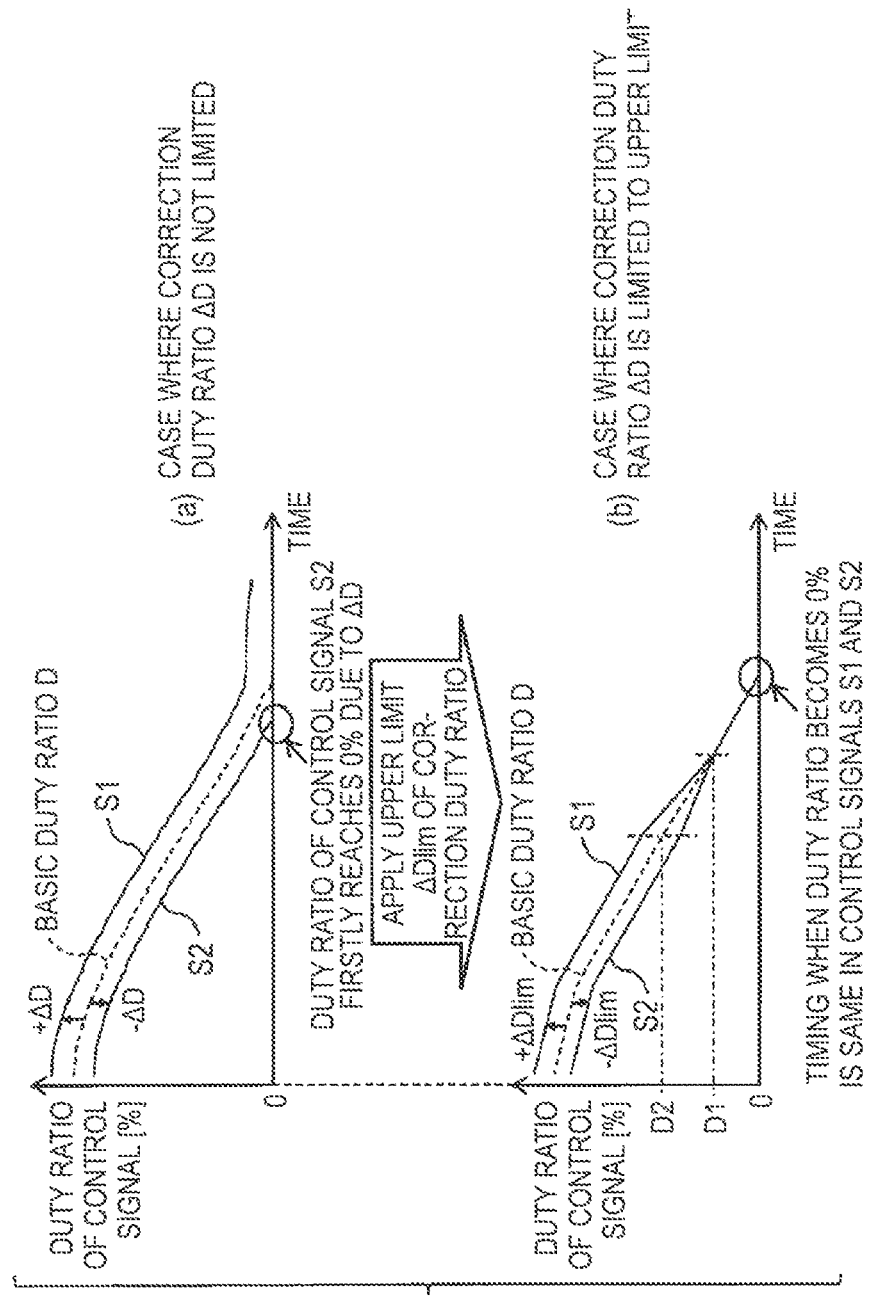
FIG. 16 is a diagram illustrating (a) an example of a change over time in each duty ratio of the control signal when the correction duty ratio is not restricted by the upper limit and (b) an example of a change over time in each duty ratio of the control signal when the correction duty ratio is restricted by the upper limit in the third embodiment, when the basic duty ratio is close to 0%.
Figure 17A:
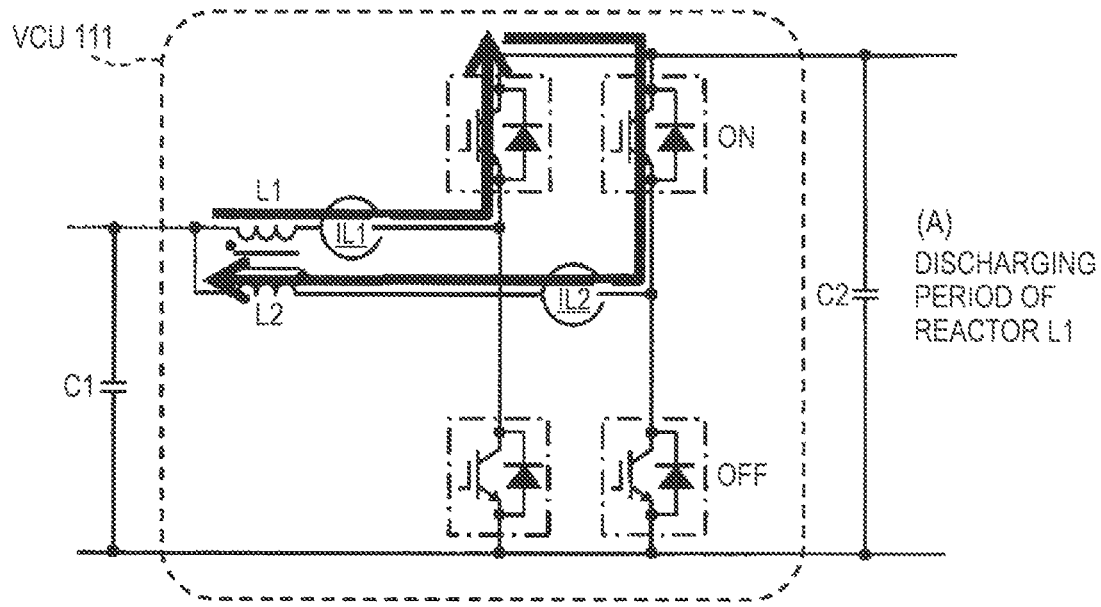
FIG. 17A is a diagram illustrating a state in which a circulating current of a direct current component that circulates within the VCU is generated.
Figure 17B:
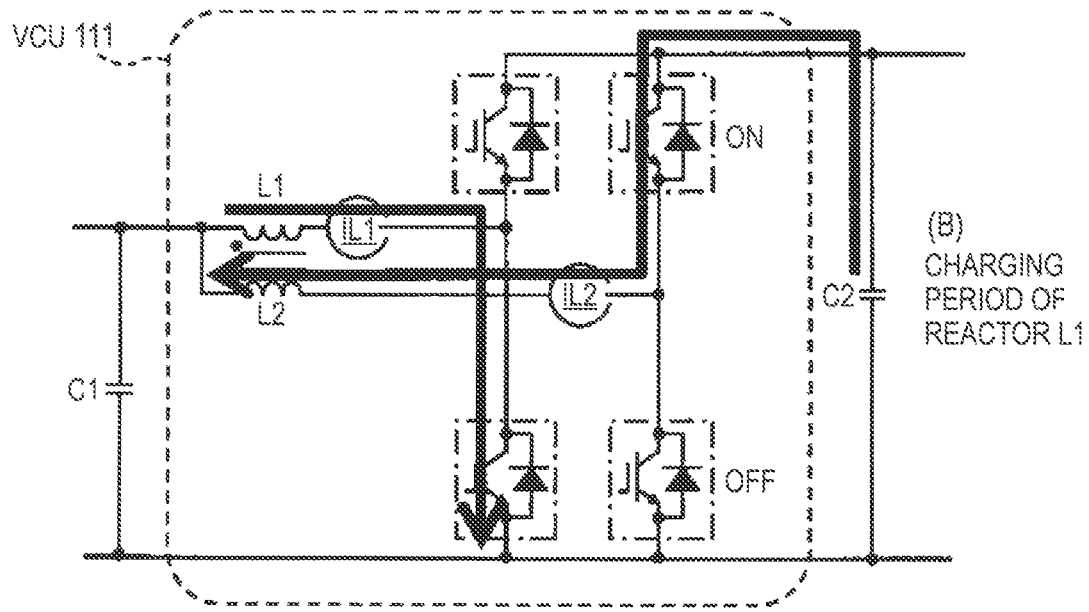
FIG. 17B is a diagram illustrating a state in which energy stored in a smoothing condenser flows to the VCU side.

The above explanation can be applied to a case in which the basic duty ratio D is close to 0%. FIG. 16 is a diagram illustrating, when the basic duty ratio D is close to 0%, (a) an example of a change over time in the duty ratios of the control signals S1 and S2 when the absolute value of the correction duty ratio ΔD is not limited to the upper limit ΔDlim, and (b) an example of a change over time in the duty ratios of the control signals S1 and S2 when the absolute value of the correction duty ratio ΔD is limited to the upper limit ΔDlim according to the third embodiment. In (a) of FIG. 16, since the correction duty ratio ΔD is not changed even when the basic duty ratio D is close to 0%, the duty ratio D−ΔD of the control signal S2 for the correction duty ratio ΔD firstly reaches 0%. In a state where the correction duty ratio D−ΔD of the control signal S2 has reached 0%, the converter to which the control signal S2 is supplied becomes the stop state. When one of the converters constituting the VCU 111 is in the stop state, during the discharging period of the reactor L1 in the other converter, as illustrated in FIG. 17A, a circulating current of a DC component, which circulates within the VCU 111, is generated and energy stored in the smoothing condenser C2 mostly flows to a side of the converter that is in the stop state. During the charging period of the reactor L1, as illustrated in FIG. 17B, the energy stored in the smoothing condenser C2 flows to the VCU 111 side. As such, when one of the converters in the VCU 111 is in the stop state, the energy is not efficiently used. Moreover, when the other converter continues to perform the voltage conversion in the stop state, there is a concern that the phase current for the control by the basic controller 321 reaches the overcurrent.

Regarding the above, when the upper limit ΔDlim of the absolute value of the correction duty ratio according to the present embodiment is applied, as indicated in (b) of FIG. 16, the correction duty ratios of the control signals S1 and S2 simultaneously reach 0%, the timing thereof is later than the timing when the correction duty ratio D−ΔD of the control signal S2 reaches 0% in (a) of FIG. 16.

Since the switching element in the respective converters constituting the VCU 111 are on and off-switching controlled by the control signals S1 and S2 described above, the VCU 111 performs a voltage conversion reflecting two types of controls, including a control for setting an input or an output as a target value and a control for equalizing the phase currents IL1 and IL2. As a result, the drift current amount indicated as a difference between the phase currents IL1 and IL2 flowing in the respective converters is reduced to a predetermined value or less when the VCU 111 boosts the input voltage V1 to the output voltage V2.

As described above, according to the present embodiment, the control signals S1 and S2 respectively controlling the two converters of the VCU 111 are generated based on the basic duty ratio D and the correction duty ratio ΔD', and the upper limit ΔDlim of the absolute value of the correction duty ratio ΔD for balancing the two phase currents is set based on the basic duty ratio D. By setting the upper limit ΔDlim, the correction duty ratio ΔD' is reduced to a proper amount with respect to the basic duty ratio D, so that any one of the converters does not become in the stop state or the directly-coupled state, and thus, the control of the VCU 111 can be stabilized. That is, the drift current between the two phase currents can be reduced in a state where the correction duty ratio ΔD' that is equal to or less than the upper limit ΔDlim does not affect the stability of the voltage conversion that is the original function of the VCU 111.

When there is a concern that the duty ratio of one of the two converters becomes 100% (directly-coupled state) or 0% (stop state) by the correction duty ratio ΔD determined by the equalization controller 325, the control signals S1 and S2 are generated only based on the basic duty ratio D. That is, since the upper limit ΔDlim of the correction duty ratio is set to 0 when the basic duty ratio D is 0% or near 0%, or near 100% or 100%, it is possible to prevent only one of the two converters from becoming the stop state or the directly-coupled state by the correction duty ratio.

The upper limit ΔDlim of the absolute value of the correction duty ratio ΔD is set to a value close to 0 as the basic duty ratio D is closer to the value D1 that is near 0% when the basic duty ratio D is within the range of D1 to D2(%), and is set to a value close to 0 as the basic duty ratio D is closer to the value D4 that is near 100% when the basic duty ratio D is within the range of D3 to D4(%). Thus, while performing the control for balancing the phase currents between the two phases, it is possible to prevent only one of the two converters from becoming the stop state or the directly-coupled state by the correction duty ratio. In addition, when the basic duty ratio D is in the range of D2 to D3(%), the upper limit ΔDlim of the absolute value of the correction duty ratio ΔD is set to a predetermined value, and thus, the control for balancing the phase currents between the two phases can be surely performed.

Fourth Embodiment

A different point of an electric vehicle according to a fourth embodiment from the electric vehicle according to the first embodiment is an internal configuration of the ECU, and the other components are the same as those of the first embodiment. Therefore, descriptions of the same components as those of the first embodiment except for the ECU will be simplified or omitted.

Figure 18:
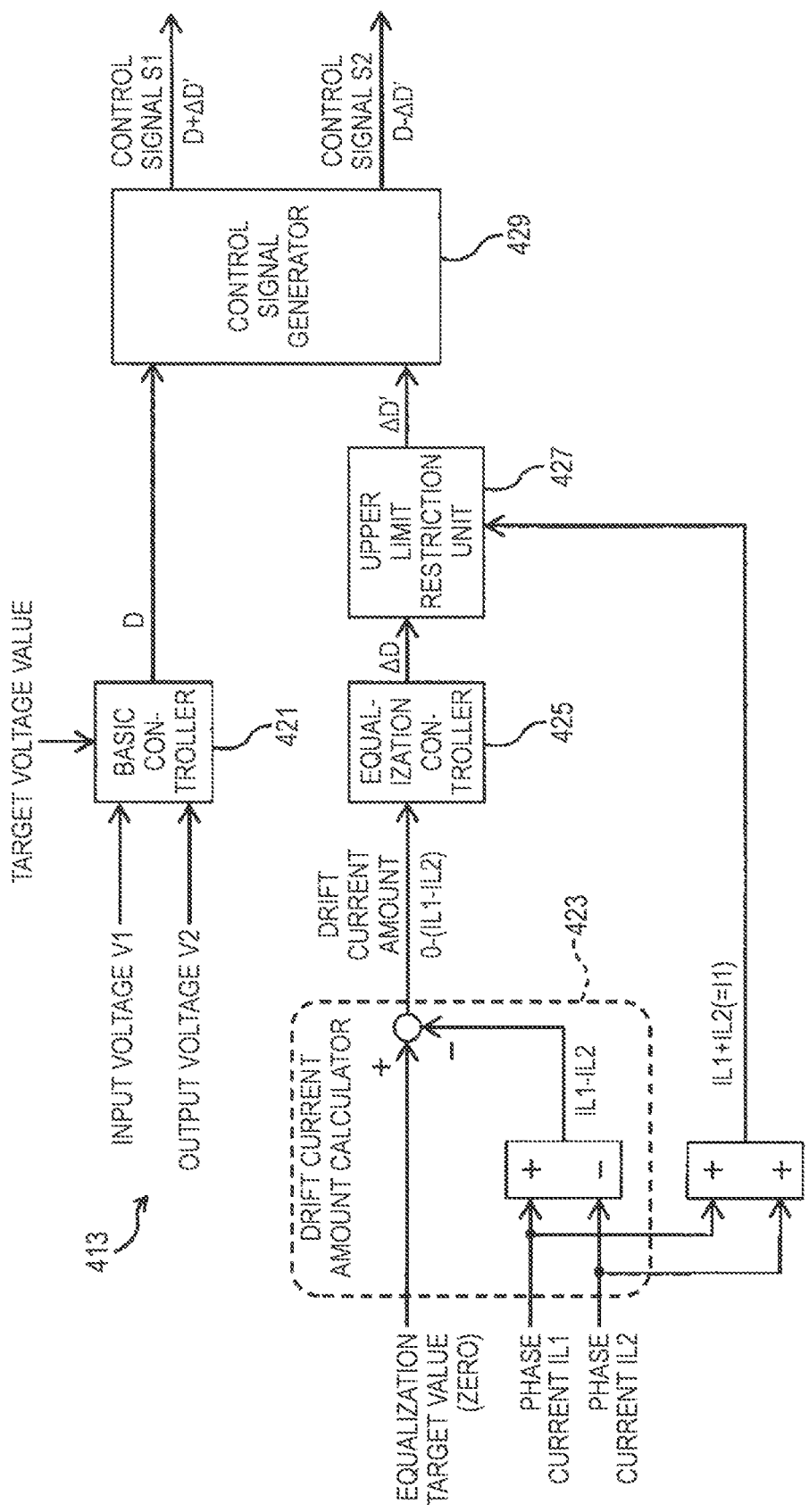
FIG. 18 is a block diagram of an internal configuration of the ECU according to a fourth embodiment.

FIG. 18 is a block diagram illustrating an internal configuration of an ECU 413 according to the fourth embodiment. In FIG. 18, the same components as those of FIG. 6 of the first embodiment are denoted by the same reference numerals. As illustrated in FIG. 18, the ECU 413 according to the fourth embodiment includes a basic controller 421, a drift current amount calculator 423, an equalization controller 425, an upper limit restriction unit 427, and a control signal generator 429. In addition, the basic controller 421 is a unit that performs the control for setting an input or an output of the VCU 111 as a target value, the drift current amount calculator 423, the equalization controller 425, and the upper limit restriction unit 427 are units that perform the control for equalizing the phase currents flowing in two converters constituting the VCU 111, and the control signal generator 429 is a unit that generates a pulse-shaped control signal corresponding to both the two controls having different purposes.

Next, the components included in the ECU 413 according to the fourth embodiment will be described below.

The basic controller 421 determines a basic duty ratio D of a control signal with respect to the switching element in each converter constituting the VCU 111 for setting an input voltage V1 or an output voltage V2 as a target voltage value, based on the input voltage V1 of the VCU 111 detected by the voltage sensor 1091, the output voltage V2 of the VCU 111 detected by the voltage sensor 1092, and the target voltage value. Alternately, the basic controller 421 may determine the basic duty ratio D of the control signal with respect to the switching element of each converter constituting the VCU 111 for setting an input current I1 as a target current value, based on the input current I1 to the VCU 111 detected by the current sensor 107 and the target current value.

The drift current amount calculator 423 calculates a difference (IL1−IL2) between the phase currents IL1 and IL2 of the respective phases in the VCU 111 detected respectively by the phase current sensors 1151 and 1152, and calculates a difference between the above difference and an equalization target value as a drift current amount. Also, the equalization target value is generally 0 (zero) [A], unless there is a specific reason, such as, biasing one phase current. Therefore, the drift current amount calculator 423 calculates "IL2−IL1 (=0−(IL1−IL2))" as the drift current amount.

The equalization controller 425 determines a correction duty ratio ΔD that is added to or subtracted from the basic duty ratio D of the control signal for equalizing the phase currents IL1 and IL2, based on the drift current amount calculated by the drift current amount calculator 423. That is, the equalization controller 425 separately determines a correction duty ratio +ΔD having a positive value and a correction duty ratio −ΔD having a negative value, in which absolute values of the correction duty ratios are equal to each other.

When the absolute value |ΔD| of the correction duty ratio ΔD determined by the equalization controller 425 is a value exceeding an upper limit ΔDlim that is set to a value less than the basic duty ratio D in advance, the upper limit restriction unit 427 outputs the upper limit ΔDlim processed with the upper limit as a correction duty ratio ΔD', and when the absolute value |ΔD| is equal to or less than the upper limit ΔDlim, the upper limit restriction unit 427 outputs the correction duty ratio ΔD determined by the equalization controller 425 as the correction duty ratio ΔD'.

The upper limit ΔDlim of the absolute value of the correction duty ratio ΔD pre-set by the upper limit restriction unit 427 is set based on a sum of the phase currents IL1 and IL2 (IL1+IL2) of the respective phases of the VCU 111 detected by the phase current sensors 1151 and 1152, that is, a magnitude of total current flowing in the VCU 111. The sum of the phase currents IL1 and IL2 (IL1+IL2) is equal to the input current I1 to the VCU 111. Thus, the upper limit ΔDlim of the absolute value of the correction duty ratio ΔD may be set based on the input current I1 detected by the current sensor 107 or a magnitude of the target current thereof. In addition, the upper limit ΔDlim may be set based on an output current of the VCU 111 or a magnitude of a target current thereof.

Figure 19:
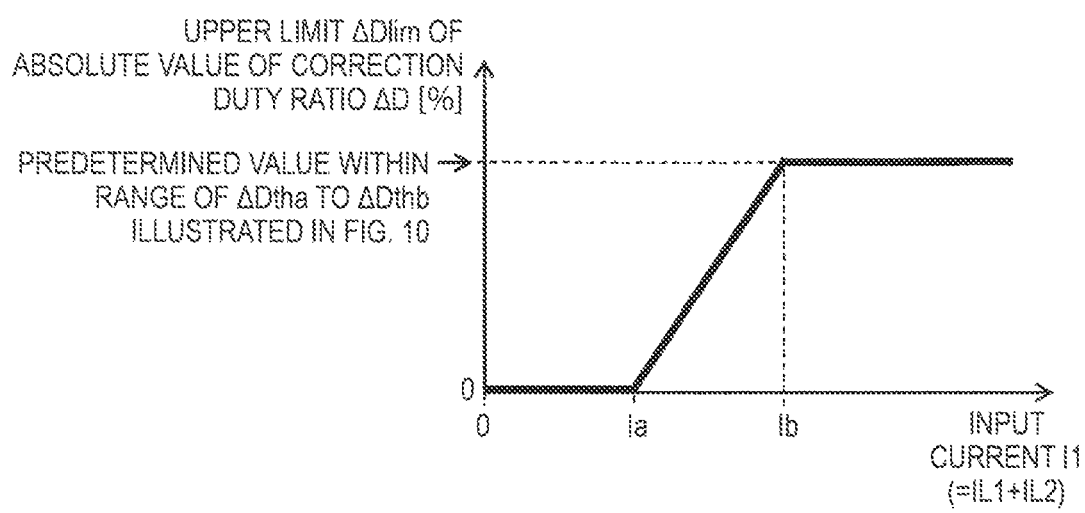
FIG. 19 is a diagram illustrating a relationship between a basic duty ratio and an upper limit of a correction duty ratio, in which the basic duty ratio is set by an upper limit restriction unit according to the fourth embodiment.

FIG. 19 is a diagram illustrating a relationship between the basic duty ratio D and the upper limit ΔDlim of the absolute value of the correction duty ratio ΔD, in which the relationship is set in the upper limit restriction unit 427 according to the fourth embodiment. In FIG. 19, values of the input current I1 have a relationship of 0<Ia<Ib. The upper limit ΔDlim of the absolute value of the correction duty ratio ΔD is a maximum value at which the duty ratio of one of two converters included in the VCU 111 does not become 0% (stop state) or 100% (directly-coupled state) by the correction duty ratio ΔD. As indicated in FIG. 19, the upper limit ΔDlim of the absolute value of the correction duty ratio ΔD according to the present embodiment is set to 0% when the input current I1 is within a range of 0 to Ia, is set to a value close to 0% as the input current I1 becomes smaller when the input current I1 is within a range of Ia to Ib, and is set to a value less than the pre-set basic duty ratio D when the input current I1 is equal to or greater than Ib. The upper limit ΔDlim of the absolute value of the correction duty ratio ΔD set in a range in which the input current I1 is within a range equal to or greater than Ib is a predetermined value within the upper limit setting range indicated in FIG. 10 described in the second embodiment. In addition, the upper limit ΔDlim is also a value equal to or greater than the maximum value ΔDtha of the correction duty ratio ΔD determined by the equalization controller 425 when the VCU 111 normally operates, and a value equal to or less than the minimum value ΔDthb of the correction duty ratio ΔD determined by the equalization controller 425 when at least one of the phase current sensors in the VCU 111 is abnormal. In addition, the predetermined value is a value closer to the maximum value ΔDtha than to the minimum value ΔDthb.

Figure 20:
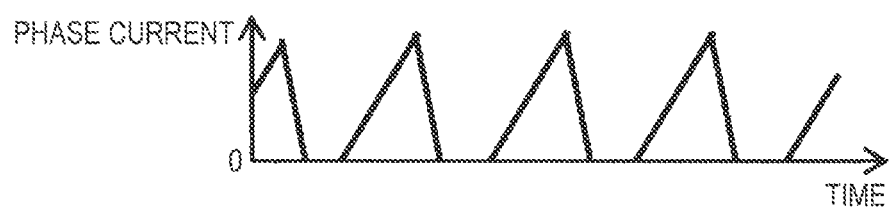
FIG. 20 is a diagram illustrating an example of a phase current in which a waveform crosses zero to become discontinuous.

A range (0 to Ia) of the input current Ia in which the upper limit ΔDlim of the absolute value of the correction duty ratio ΔD is set to 0% is a so-called low current region. When the control for equalizing the phase currents in the low current region is performed based on the correction duty ratio ΔD, as illustrated in FIG. 20, the waveform of the current is discontinuous to cross zero in at least one of the phase currents flowing in the two converters. Since the converter in which such a phase current flows becomes a discontinuous mode, the control stability degrades. Therefore, according to the present embodiment, in the low current region in which at least one of the converters constituting the VCU 111 is likely to be in the discontinuous mode, the upper limit ΔDlim of the absolute value of the correction duty ratio ΔD is set to 0% so that the control is performed only based on the basic duty ratio D.

As illustrated in FIG. 19, the value Ia that is the maximum value of the input current I1 in the low current region is a minimum value, by which one of the two converters in the VCU 111 does not become the stop state by the basic duty ratio D, even when an error included in the detection values of the phase current sensors 1151 and 1152 included in the VCU 111 is considered. For example, when a duty ratio corresponding to the error included in the detection values of the phase current sensors 1151 and 1152 is De, a duty ratio corresponding to the error included in the input current I1 is "2De". In this case, the actual input current I1 when the VCU 111 is controlled with the basic duty ratio having a value slightly greater than the duty ratio 2De is set as the input current Ia.

The control signal generator 429 generates two types of control signals S1 and S2, that is, the control signal S1 having the duty ratio D+ΔD' and the control signal S2 having the duty ratio D−ΔD', based on the basic duty ratio D determined by the basic controller 421 and the correction duty ratio ΔD' output by the upper limit restriction unit 427. One of the two types of control signals S1 and S2 generated by the control signal generator 429 is supplied to the switching element in one of the two converters constituting the VCU 111 and the other control signal is supplied to the switching element of the other converter.

Since the switching element in the respective converters constituting the VCU 111 are on and off-switching controlled by the control signals S1 and S2 described above, the VCU 111 performs a voltage conversion reflecting two types of controls including a control for setting an input or an output as a target value and a control for equalizing the phase currents IL1 and IL2. As a result, the drift current amount indicated as a difference between the phase currents IL1 and IL2 flowing in the respective converters is reduced to a predetermined value or less when the VCU 111 boosts the input voltage V1 to the output voltage V2.

As described above, according to the present embodiment, the control signals S1 and S2 respectively controlling the two converters in the VCU 111 that includes the phase current sensors 1151 and 1152 having the detection value with the error are set based on the basic duty ratio D and the correction duty ratio ΔD'. The upper limit ΔDlim of the absolute value of the correction duty ratio ΔD for balancing the phase current between the two phases is set based on the sum of the phase currents IL1 and IL2 flow in the respective converters, or the input current I1 to the VCU 111 or a magnitude of the target current thereof. By setting the upper limit ΔDlim, the correction duty ratio ΔD' is reduced to an appropriate amount with respect to the magnitude of the current, so that any one of the converters is not in the stop state, and thus, the control of the VCU 111 can be stabilized without the circulating current flowing. That is, the drift current between the two phase currents can be reduced in a state where the correction duty ratio ΔD' that is equal to or less than the upper limit ΔDlim does not affect the stability of the voltage conversion that is the original function of the VCU 111.

In the low current region where there is a concern that at least one of the two converters becomes the discontinuous mode by the correction duty ratio ΔD, the control signals S1 and S2 are generated only based on the basic duty ratio D and the control of the VCU 111 can be stabilized. That is, the correction duty ratio does not affect the stability of the voltage conversion that is the original function of the conversion module.

When the sum of the phase currents IL1 and IL2 or the input current I1 to the VCU 111 or the magnitude of the target current thereof is small, the upper limit ΔDlim of the absolute value of the correction duty ratio ΔD is set to 0%. Thus, it is possible to prevent one of the two converters from becoming the discontinuous mode by the correction duty ratio ΔD'.

Even when there is an unavoidable error in the phase current sensors 1151 and 1152, at least one of the converters does not become in the stop state by the control based on the basic duty ratio D. and thus the stability of the voltage conversion in the VCU 111 can be secured.

Since the upper limit ΔDlim of the absolute value of the correction duty ratio ΔD is set to a value close to 0 as close to the low current region, it is possible to prevent one of the two converters from becoming the discontinuous mode by the correction duty ratio ΔD' while the control for balancing the phase currents between the two phases is performed.

In a region where the sum of the phase currents IL1 and IL2 or the input current I1 to the VCU 111 or the magnitude of the target current thereof is sufficiently large, the upper limit ΔDlim of the absolute value of the correction duty ratio ΔD is set to a predetermined value within the upper limit setting range, and thus, the control for balancing the phase currents between the two phases can be surely performed.

The present invention is not limited to the above-described embodiments, and appropriate modifications, improvement, and the like are possible. For example, although the above first to fourth embodiments are described independently from one another, the electric vehicle may be configured by combining two or more embodiments.

The electric vehicle described above is a 1MOT-type electrical vehicle (EV), but the electric vehicle may be an EV equipped with a plurality of motor generators, or a hybrid electrical vehicle (HEV) or a plug-in hybrid electrical vehicle (PHEV) which is equipped with an internal combustion engine, as well as at least one motor generator. In addition, in the above embodiments, an example in which the conversion apparatus according to the present invention is mounted in the electric vehicle has been described, but the conversion apparatus may be provided in an electrical device that is not for the transportation purpose. The conversion apparatus is appropriate for a power source capable of outputting a large current, and in particular, is preferably applied to a computer that has demanded a large current recently.

The VCU 111 according to the embodiment is a booster type voltage converter that boosts the voltage of the battery 105, but the VCU 111 may be a step-down type voltage converter that steps down the voltage of the battery 105 or a step-up and step-down type voltage converter capable of stepping up and down the voltage bi-directionally.

REFERENCE SINGS LIST 101 motor generator
103 PDU
111 VCU
105 battery
107 current sensor
1151, 1152 phase current sensor
1091, 1092 voltage sensor
113, 213, 313, 413 ECU
121, 221, 321, 421 basic controller
123, 223, 323, 423 drift current amount calculator
125, 225, 325, 425 equalization controller
127, 229, 329, 429 control signal generator
227, 327, 427 upper limit restriction unit
C1, C2 smoothing condenser
L1, L2 reactor
Co iron core

The invention claimed is:

1. A conversion apparatus comprising:
a conversion module having a plurality of phases, each of which includes a converter capable of performing a voltage conversion of electric power discharged from or charged in a power source and a sensor for detecting a current value of a phase current flowing in the respective converter, wherein the plurality of phases are electrically connected in parallel; and
a controller for controlling a plurality of converters respectively according to a control signal generated based on a predetermined duty ratio, wherein
the controller includes:
a first determination unit for determining a basic duty ratio common to all of the plurality of phases, so that an input or an output of the conversion module becomes equal to a target voltage or a target current;
a second determination unit for determining correction duty ratios including a positive value and a negative value and correcting the basic duty ratio for each of the plurality of converters, absolute values of the positive value and the negative value being equal to each other; and
a generator for generating the control signal based on the basic duty ratio and the correction duty ratios, wherein
the second determination unit determines the correction duty ratios based on a difference between a plurality of phase currents respectively flowing in the plurality of converters, and
the basic duty ratio is equal to or greater than absolute values of the correction duty ratios.

2. The conversion apparatus according to claim 1, wherein
an absolute value of a sum of individual correction duty ratios with respect to the plurality of converters is equal to or less than a predetermined value.

3. The conversion apparatus according to claim 2, wherein
the sum of individual correction duty ratios with respect to the plurality of converters is 0.

4. The conversion apparatus according to claim 1, wherein
the second determination unit determines the correction duty ratios that are within an upper limit or lower limit and whose absolute values are smaller than the basic duty ratio.

5. The conversion apparatus according to claim 4, wherein
the absolute value of the upper limit or the lower limit is a value equal to or greater than a maximum value of the correction duty ratios that are determined from a difference between current values that are output normally from all of sensors included in the plurality of phases.

6. The conversion apparatus according to claim 4, wherein
the absolute value of the upper limit or the lower limit is a value equal to or less than a minimum value of the correction duty ratios that are determined from a difference between current values that are output when some of sensors included in the plurality of phases are abnormal.

7. The conversion apparatus according to claim 4, wherein
the absolute value of the upper limit or the lower limit is a value equal to or greater than a maximum value of the correction duty ratios that are determined from a difference between current values that are output normally from all of sensors included in the plurality of phases, and a value equal to or less than a minimum value of the correction duty ratios that are determined from a difference between current values that are output when some of the sensors included in the plurality of phases are abnormal.

8. The conversion apparatus according to claim 7, wherein
the absolute value of the upper limit or the lower limit is a value closer to the maximum value than the minimum value.

9. A conversion apparatus comprising:
a conversion module having two phases, each of which includes a converter capable of performing a voltage conversion of an electric power discharged from or charged in a power source and a sensor for detecting a current value of a phase current flowing in the respective converter, wherein the two phases are electrically connected in parallel; and a controller for controlling two converters respectively according to a control signal generated based on a predetermined duty ratio, wherein
the controller includes:
a first determination unit for determining a basic duty ratio common to all of the plurality of phases, so that an output of the conversion module becomes equal to a target voltage or a target current;
a second determination unit for determining correction duty ratios including a positive value and a negative value and correcting the basic duty ratio for each of the two converters, absolute values of the positive value and the negative value being equal to each other; and
a generator for generating the control signal based on the basic duty ratio and the correction duty ratios, wherein
the second determination unit determines the correction duty ratios based on a difference between a plurality of phase currents respectively flowing in the two converters, and
the basic duty ratio is equal to or greater than absolute values of the correction duty ratios.

10. A device comprising the conversion apparatus according to claim 1.

11. A control method of a conversion apparatus including a conversion module having a plurality of phases, each of which includes a converter capable of performing a voltage conversion of electric power discharged from or charged in a power source and a sensor for detecting a current value of a phase current flowing in the respective converter, in which the plurality of phases are electrically connected in parallel, and
a controller for controlling a plurality of converters respectively according to a control signal generated based on a predetermined duty ratio, the control method comprising:
determining a basic duty ratio that is common to all of the plurality of phases so that an output of the conversion module becomes equal to a target voltage or a target current;
determining individual correction duty ratios with respect to the plurality of converters based on a difference among a plurality of phase currents flowing in the plurality of converters respectively, wherein the correction duty ratios include a positive value and a negative value and absolute values of the correction duty ratios are equal to or less than the basic duty ratio, absolute values of the positive value and the negative value being equal to each other; and
generating the control signal based on the basic duty ratio and the correction duty ratios.

12. A control method of a conversion apparatus including a conversion module having two phases, each of which includes a converter capable of performing a voltage conversion of electric power discharged from or charged in a power source and a sensor for detecting a current value of a phase current flowing in the respective converter, wherein the two phases are electrically connected in parallel, and
a controller for controlling the two converters respectively according to a control signal generated based on a predetermined duty ratio, the control method comprising:
determining a basic duty ratio that is common to the two phases so that an output of the conversion module becomes equal to a target voltage or a target current;
determining individual correction duty ratios with respect to the two converters based on a difference between two phase currents flowing in the two converters respectively, wherein the correction duty ratios include a positive value and a negative value and absolute values of the correction duty ratios are equal to or less than the basic duty ratio, absolute values of the positive value and the negative value being equal to each other; and
generating the control signal based on the basic duty ratio and the correction duty ratios.

\* \* \* \* \*